US011585301B1

(12) United States Patent
Boyer et al.

(10) Patent No.: US 11,585,301 B1
(45) Date of Patent: Feb. 21, 2023

(54) TWO-STAGE BOOST SYSTEM FOR ENGINES

(71) Applicant: Ford Global Technologies, LLC, Dearborn, MI (US)

(72) Inventors: Brad Alan Boyer, Canton, MI (US); Keith Plagens, Northville, MI (US); Gregory McConville, Ann Arbor, MI (US); Michael Shelby, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/644,305

(22) Filed: Dec. 14, 2021

(51) Int. Cl.
*F02M 26/08* (2016.01)
*F02B 37/18* (2006.01)
*F02B 75/20* (2006.01)
*F02B 75/22* (2006.01)
*F02B 37/00* (2006.01)
*F02B 37/013* (2006.01)
*F02B 37/24* (2006.01)
*F02B 75/18* (2006.01)
*F02B 37/16* (2006.01)
*F02M 31/20* (2006.01)
*F02D 41/02* (2006.01)
*F02B 29/04* (2006.01)

(52) U.S. Cl.
CPC ........... *F02M 26/08* (2016.02); *F02B 37/001* (2013.01); *F02B 37/013* (2013.01); *F02B 37/18* (2013.01); *F02B 37/24* (2013.01); *F02B 75/20* (2013.01); *F02B 75/22* (2013.01); *F02D 41/0235* (2013.01); *F02M 31/20* (2013.01); *F02B 29/04* (2013.01); *F02B 37/16* (2013.01); *F02B 2075/1824* (2013.01)

(58) Field of Classification Search
CPC .... F02B 37/004; F02B 37/013; F02B 37/001; F02B 37/24; F02B 37/16; F02B 37/18; F02B 29/04; F02B 75/02; F02B 75/22; F02D 41/0235
See application file for complete search history.

(56) References Cited

U.S. PATENT DOCUMENTS

| 7,165,403 B2 | 1/2007 | Sun et al. |
| 8,234,865 B2 | 8/2012 | Andrews |
| 8,671,682 B2 | 3/2014 | Parlow et al. |
| 8,844,285 B2 | 9/2014 | An |

(Continued)

FOREIGN PATENT DOCUMENTS

| DE | 102006027117 A1 * | 12/2007 | ........... F01N 13/143 |
| DE | 102010023047 A1 * | 12/2011 | ........... F01D 17/143 |

(Continued)

OTHER PUBLICATIONS

Machine generated translation of DE 102010023047 A1.*

*Primary Examiner* — Ngoc T Nguyen
(74) *Attorney, Agent, or Firm* — Vincent Mastrogiacomo; McCoy Russell LLP

(57) ABSTRACT

A dual turbocharger system for an engine is provided. In one example, the dual turbocharger system may include two variable geometry turbines (VGTs), with each turbine being of the same size and operating in parallel, and with each compressor of the turbocharger operating in series, the first compressor of the first turbocharger being larger than the second compressor of the second turbocharger.

12 Claims, 5 Drawing Sheets

(56) References Cited

U.S. PATENT DOCUMENTS

| | | |
|---|---|---|
| 9,062,594 B2 | 6/2015 | Robinson |
| 9,157,363 B2 | 10/2015 | Wade et al. |
| 9,534,542 B2 | 1/2017 | Ku et al. |
| 2004/0134193 A1* | 7/2004 | Klingel .................. F02B 37/24 60/602 |
| 2006/0059908 A1* | 3/2006 | Schorn ................ F02B 37/162 60/599 |
| 2007/0062188 A1* | 3/2007 | Fry ...................... F02B 37/002 60/599 |
| 2013/0006494 A1* | 1/2013 | Petrovic ............... F02B 37/162 701/102 |
| 2014/0230430 A1* | 8/2014 | Krug .................. F02B 29/0412 60/273 |
| 2015/0139777 A1* | 5/2015 | Almkvist ............... F02B 21/00 415/1 |
| 2016/0312687 A1* | 10/2016 | Kemmerling .......... F02B 37/18 |
| 2017/0260892 A1* | 9/2017 | Miazgowicz .......... F01N 3/046 |
| 2017/0268443 A1* | 9/2017 | Yamazaki ............. F02D 41/029 |
| 2018/0010512 A1* | 1/2018 | Kemmerling ......... F02B 37/183 |
| 2020/0080502 A1* | 3/2020 | Glugla ................. F02D 35/027 |

FOREIGN PATENT DOCUMENTS

| | | | | |
|---|---|---|---|---|
| DE | 102015207539 B4 | * | 12/2018 | ............ F02B 37/001 |
| EP | 1640583 A2 | * | 3/2006 | ............ F02B 37/00 |
| EP | 1777387 A1 | * | 4/2007 | ............ F01N 13/009 |
| WO | WO-2007098133 A1 | * | 8/2007 | ............ F02B 37/004 |

* cited by examiner

TWO-STAGE BOOST SYSTEM FOR ENGINES

FIELD

The present description relates generally to methods and systems for providing boost pressure via dual turbochargers, with the turbines operating in parallel and the compressors operating in series.

BACKGROUND/SUMMARY

Internal combustion engines, in particular diesel and gasoline engines, are frequently equipped with turbochargers. A turbocharger operates by compression of the intake airflow into the engine in order to achieve more power. In particular, a predetermined power can be generated by a turbocharged engine with a smaller displacement volume and thus smaller size and less weight, thereby achieving an increased specific power and a reduction of fuel consumption. In general, turbochargers are driven by the exhaust flow of the internal combustion engine. To this end, a turbocharger comprises a turbine arranged in the exhaust flow of the internal combustion engine, driving a compressor for compressing the intake airflow of the engine via a connecting drive shaft.

Internal combustion engines equipped with turbochargers may run at a higher thermal efficiency using a Miller cycle. A Miller cycle may operate a two-stroke engine cycle or a four-stroke engine cycle and may include injecting compressed air into a cylinder of the engine via a turbocharger, while employing modified intake valve timing, in order to provide a smaller, compressed volume of air during the engine cycle. By using a Miller cycle, an effective compression ratio (the ratio of volume of gases in the cylinder at intake valve closing to the volume of gases in the cylinder at TDC of the compression stroke) of the cylinders may be reduced while maintaining the expansion ratio (the ratio of the volume of gasses in the cylinder at BDC to the volume at TDC) of the cylinders, thereby increasing thermal efficiency of the engine.

However, due to the smaller volume of trapped gases within the cylinder during the compression and combustion strokes, the Miller cycle may have reduced power density. In order to increase power density within the short duration of the intake valve opening, a high boost pressure is desirable. Typical single-stage compressors cannot efficiently boost beyond a pressure ratio of about 3, where the pressure ratio is defined as the ratio of the total pressure of the boosted air to atmospheric pressure. In order to overcome the above issues, a two-stage turbocharger may be used to achieve higher overall pressure ratios, e.g. with pressure ratios as high as 6. In order to achieve higher pressure ratios in a two-stage turbocharger, typically the number of turbochargers is doubled from a single-stage turbocharger, and complicated valving on a hot end of the turbochargers is included to efficiently produce boost at various engine speeds and loads. For example, in a V6 engine, a typical two-stage turbocharger may include two turbochargers or possibly four turbochargers, with a first (high pressure) turbocharger being fed by all six cylinders, with the output of the first turbocharger being fed into a second turbocharger. This packaging may provide for extra complexity for a V6 engine, with exhaust exiting from opposite outward facing ports on the cylinder heads. Additionally, pulsations from 6 cylinders feeding into a single turbocharger may lead to undesirable backpressure pulses that negatively affect residual gas in the cylinders. This can be negated using a twin scroll or dual volute turbo, but neither of those configurations are compatible with a variable geometry turbine (VGT), which is desirable for increased efficiency.

To overcome some of the aforementioned issues, one approach may be to use a dual turbocharger configured to operate in a parallel configuration under a first set of operating conditions, and to operate in a series configuration under a second set of operating conditions. One such example approach is shown by Sun et al. in U.S. Pat. No. 7,165,403 B2. Therein, Sun et al. teach a first embodiment of a dual turbocharger system with two turbochargers, with the variable geometry turbines and the compressors each switchable between parallel and series configurations based on operating conditions, and a second embodiment of a dual turbocharger system including turbines in a fixed parallel configuration, with the compressors switchable between parallel and series configurations based on operating conditions. In this way, the dual turbocharger may be able to generate more boost via a series configuration as compared to operation of a dual turbocharger system configured in parallel, and may be able to operate efficiently at different engine loads via either parallel or series configurations.

However, the inventors herein have recognized potential issues with such systems. As one example, in both of the embodiments, while the turbines may be configured to operate in a parallel configuration with a first turbine fluidly coupled to a first cylinder bank via a first portion of the exhaust manifold and a second turbine coupled to a second cylinder bank via a second portion of the exhaust manifold, there may be fluid coupling between the first portion of the exhaust manifold and the second portion of the exhaust manifold, allowing exhaust from each cylinder bank to enter into each of the turbines. This exhaust mixing prior to operation within each turbocharger, due to fluid coupling between the first portion of the exhaust manifold and the second portion of the exhaust manifold, may lead to unwanted backpressure in the exhaust system. The embodiments provided in U.S. Pat. No. 7,165,403 B2 also include complicated valving systems and exhaust manifold geometries for switching between parallel and series configurations, adding more complexity, cost, and packaging concerns during manufacturing.

In one example, the issues described above may be addressed by a system for an engine, comprising: a first turbocharger including a first turbine and a first compressor, and a second turbocharger including a second turbine and a second compressor, the first and second compressors differently sized and coupled in series. In this way, boost pressures may be increased with a simplified exhaust system plumbing, allowing for simple and efficient operation of a Miller cycle over a range of engine speeds and loads.

As one example, an engine system may comprise a dual turbocharger system, in which a first cylinder bank may feed into a first turbine of a first turbocharger via a first part of an exhaust manifold, and a second cylinder bank may feed into a second turbine of a second turbocharger via a second part of an exhaust manifold. Both turbines may be variable geometry turbines (VGTs), and may be of the same size. The first turbocharger may also include a first compressor, and the second turbocharger may include a second compressor, the first compressor larger than the second compressor. Each of the first and second compressors may include compressor recirculation valves coupled across the respective compressor. Each of the first turbine and the second turbine are in parallel, while each of the first compressor and the second compressor may operate in series, with an output of the first compressor being input to the second compressor. The dual turbocharger system may also include a first charge air cooler coupled to an intake passage between the first compressor and the second compressor, and a second air cooler coupled to the intake passage downstream of the second compressor. The cylinders of each bank may fire at even intervals, such that firing timing from each cylinder bank is evenly distributed among each cylinder within an engine cycle. Each of a first turbine of the first turbocharger and a second turbine of the second turbocharger may operate in parallel, the first portion of the exhaust manifold and the second portion of the exhaust manifold being fluidly decoupled. The compressors of the first and second turbocharger operate in series, such that ambient intake air is drawn into the first compressor. The output may then go through the first charge air cooler, after which it may be fed into the second compressor, which may output further boosted air, which may enter a second charge air cooler before being introduced into the intake manifold.

In this way, by utilizing a dual turbocharger system with parallel VGTs of similar sizes and series compressors of different sizes, higher boost pressures may be achieved in a simple exhaust manifold configuration. The technical effect of including two differently sized compressors in series is that boosting may be done in two stages, with a first stage of compression from the first (larger) compressor providing a lower level of boosting as an input to the second (smaller) compressor. The larger diameter of the first compressor may allow for more efficient operation of the second (smaller) compressor. The amount of boost required may then be adjusted via the VGT of each turbocharger, based on engine load during engine operation. Additionally, by adjusting a timing of cylinder firing within each cylinder bank during an engine cycle, two-stage boosting for parallel turbines without pulse interference may be achieved, thereby reducing backpressure on the cylinders.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
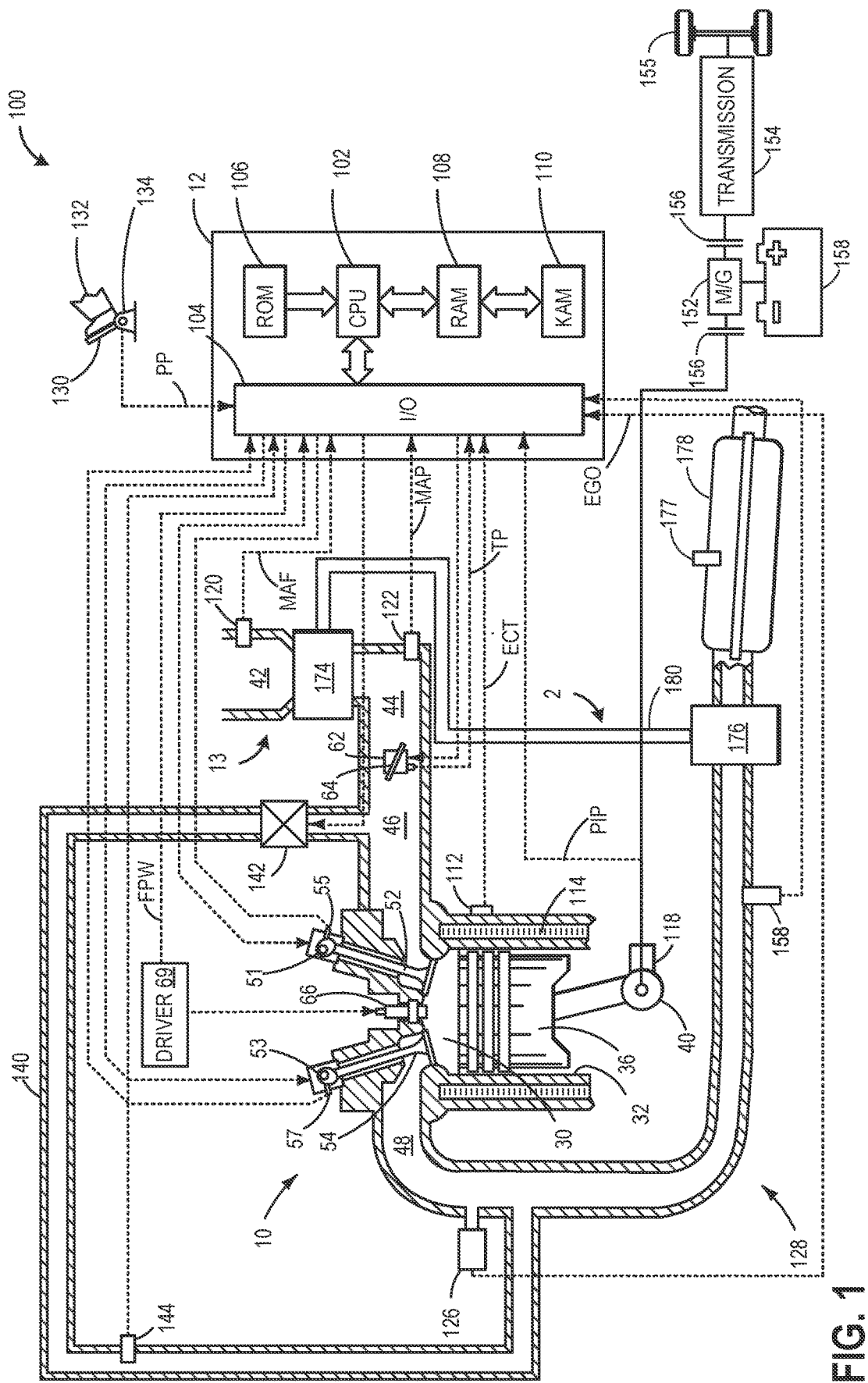
FIG. 1 shows a schematic example of an engine system including a turbocharger.
Figure 2:
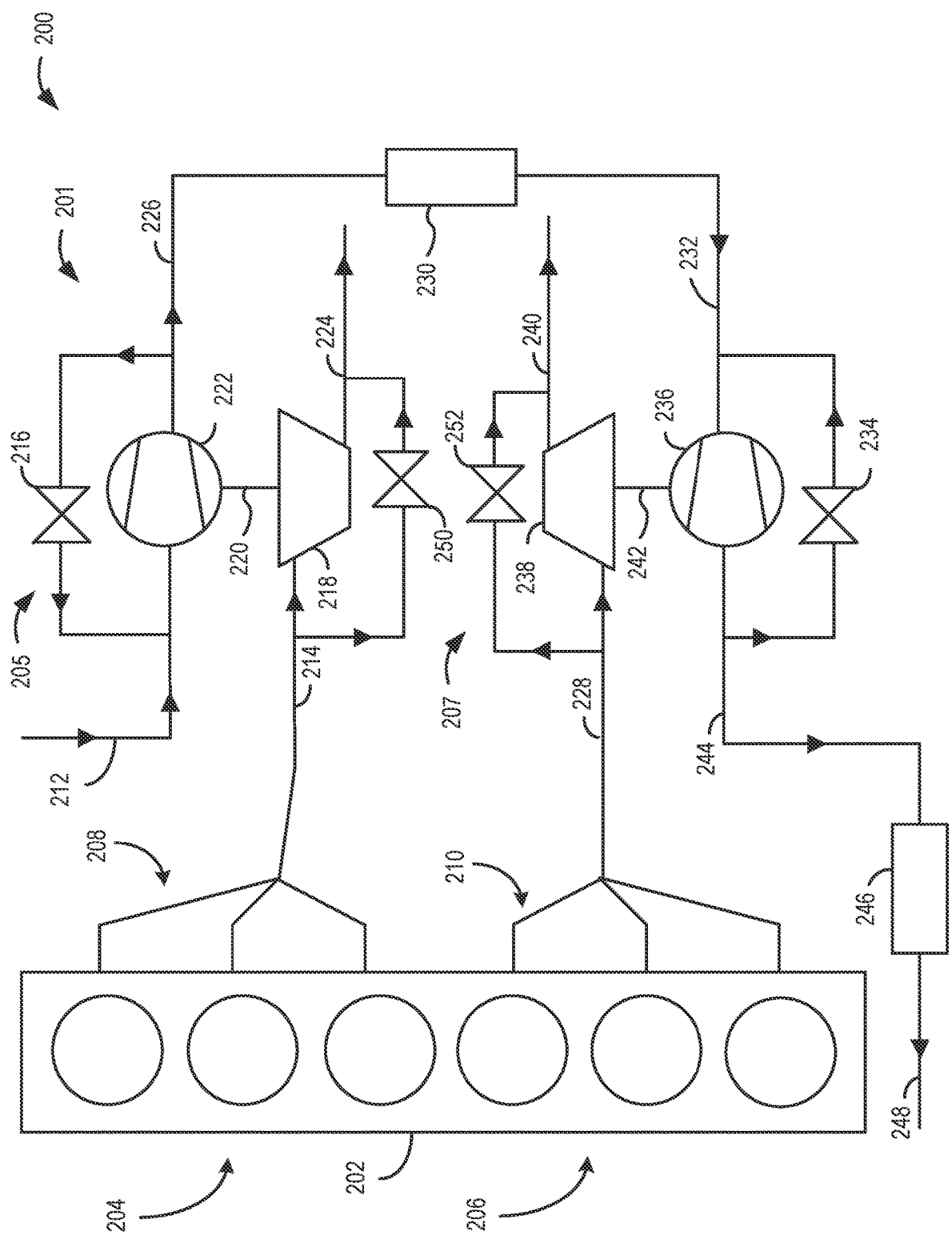
FIG. 2 shows a schematic example of a dual turbocharger system for an I6 engine, including turbines operating in parallel and compressors operating in series, according to the present disclosure.
Figure 3:
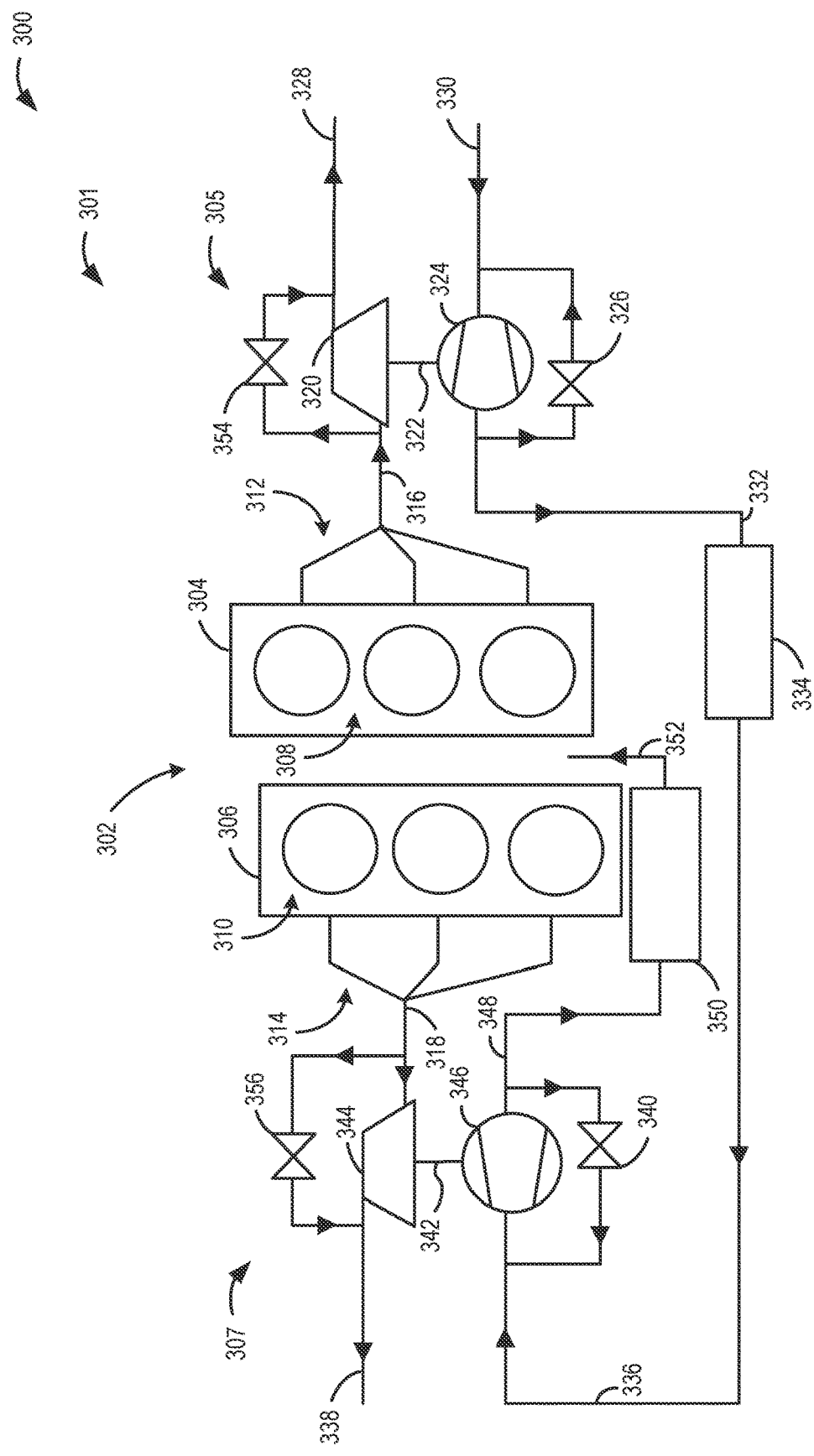
FIG. 3 shows a schematic example of a dual turbocharger system for a V6 engine, including turbines operating in parallel and compressors operating in series, according to the present disclosure.

The following description relates to systems and methods for operating a dual turbocharger, including parallel variable geometry turbines (VGTs) of similar sizes and series compressors of different sizes, in order to achieve higher pressure ratios for a Miller cycle during engine operation. The turbocharger may be included in an engine system, as shown in FIG. 1. FIG. 2 depicts an example of a dual turbocharger system of an I6 engine, including parallel operation of the turbines of the turbochargers and series operation of the compressors. Similarly, FIG. 3 depicts an example of a dual turbocharger system of a V6 engine, including parallel operation of the turbines of the turbochargers and series operation of the compressors. A controller may be configured to perform a control routine, such as the example routine of FIG. 4, to operate the turbochargers of FIGS. 2-3 based on engine operating conditions. FIG. 5 provides an example timeline of operation of the dual turbocharger system.

FIG. 1 shows a schematic diagram with one cylinder of multi-cylinder engine 10, which may be included in a propulsion system of a vehicle 100. Engine 10 may be a six-cylinder engine, for example either a V6 engine or an I6 engine. However, other multi-cylinder engines may also be utilized. Engine 10 may be controlled at least partially by a control system including a controller 12 and by input from a vehicle operator 132 via an input device 130. In this example, input device 130 includes an accelerator pedal and a pedal position sensor 134 for generating a proportional pedal position signal PP. A combustion chamber 30 (also termed, cylinder 30) of the engine 10 may include combustion chamber walls 32 with a piston 36 positioned therein. Piston 36 may be coupled to a crankshaft 40 so that reciprocating motion of the piston is translated into rotational motion of the crankshaft. Crankshaft 40 may be coupled to at least one drive wheel of a vehicle via a transmission 154. Further, a starter motor may be coupled to the crankshaft 40 via a flywheel (not shown) to enable a starting operation of the engine 10.

Cylinder 30 can receive intake air via a series of intake passages 42, 44, and 46. Intake air passage 46 may communicate with other cylinders of engine 10 in addition to cylinder 30. The intake air passage 46 and the exhaust passage 48 can selectively communicate with the cylinder 30 via intake valve 52 and exhaust valve 54 respectively. In some embodiments, the cylinder 30 may include two or more intake valves and/or two or more exhaust valves. FIG. 1 shows engine 10 configured with a multi-stage turbocharger arrangement 2 depicted schematically and shown in greater detail in FIG. 2. The multi-stage turbocharger arrangement 2 comprises a first turbocharger and a second turbocharger including compressors 174 arranged between intake passages 42 and 44 of intake system 13, and exhaust turbines 176 arranged along exhaust passage 48 in exhaust system 128. Compressors 174 may be at least partially powered by exhaust turbines 176 via shafts 180 where the boosting device is configured as a turbocharger.

The turbocharger system of the present disclosure comprises two turbochargers with variable geometry turbines (VGT), in which turbines of each turbocharger are arranged in parallel, while compressors of each turbocharger are arranged in series. The first turbocharger comprises a first variable geometry turbine driving a first compressor. The second turbocharger comprises a second variable geometry turbine driving a second compressor, the second compressor fluidly coupled in series with the first compressor. Additionally, the first variable geometry turbine and the second variable geometry turbine may be similarly sized, whereas the first compressor may be of a larger diameter than the second compressor. Turbocharger arrangement 2 is shown in greater detail with reference to FIG. 2 below.

In the example depicted in FIG. 1, the intake valve 52 and exhaust valve 54 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 52 and the exhaust valve 54 may be determined by position sensors 55 and 57, respectively. In alternative embodiments, the intake valve 52 and/or exhaust valve 54 may be controlled by electric valve actuation. For example, the cylinder 30 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system. A cam timing may be adjusted (by advancing or retarding the VCT system) to adjust an engine dilution in coordination with an EGR flow thereby reducing EGR transients and improving engine performance.

Cylinder 30 can have a geometric compression ratio, which is the ratio of volumes when piston 36 is at BDC to TDC. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock. Cylinder 30 may also have an effective compression ratio, which is defined as the ratio of volumes of the gaseous charge in the cylinder 30 when intake valve 52 closes to TDC. Due to the level of compression of the charge in the cylinder 30, the effective compression ratio may not be the same as the geometric compression ratio. For example, if the intake valve remains open for some portion of the compression stroke as the piston moves upward from BDC, some air will exit the cylinder via the intake valve. When the intake valve closes, the volume of the cylinder will be smaller than the volume at BDC. This smaller volume of air is compressed during the remainder of the compression stroke leading to the effective compression ratio being smaller than the geometric compression ratio.

In some embodiments, each cylinder of the engine 10 may be configured with one or more fuel injectors for providing fuel thereto. As a non-limiting example, the cylinder 30 is shown including one fuel injector 66. Fuel injector 66 is shown coupled to the cylinder 30 for injecting fuel directly therein in proportion to the pulse width of signal FPW received from controller 12 via electronic driver 69. In this manner, fuel injector 66 provides what is known as direct injection of fuel into cylinder 30. It will also be appreciated that the cylinder 30 may receive fuel from a plurality of injections during a combustion cycle. In other examples, the fuel injector may be mounted in the side of the combustion chamber or in the top of the combustion chamber, for example. Fuel may be delivered to fuel injector 66 by a fuel system (not shown) including a fuel tank, a fuel pump, and a fuel rail.

In one example, the engine 10 may be a diesel engine that combusts air and diesel fuel through compression ignition. In other non-limiting embodiments, the engine 10 may combust a different fuel including gasoline, biodiesel, or an alcohol containing fuel blend (e.g., gasoline and ethanol or gasoline and methanol) through compression ignition and/or spark ignition. Thus, the embodiments described herein may be used in any suitable engine, including but not limited to, diesel and gasoline compression ignition engines, spark ignition engines, direct or port injection engines, etc.

The intake passages 44 and 46 further include a throttle 62, including a throttle plate 64, which may be provided along the intake passages for varying the flow rate and/or pressure of intake air provided to the engine cylinders. For example, throttle 62 may be disposed downstream of compressors 174 as shown in FIG. 1, or alternatively may be provided upstream of compressors 174. In this particular example, the position of the throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the cylinder 30 among other engine cylinders. The position of the throttle plate 64 may be provided to the controller 12 by throttle position signal TP. The intake passage 42 may include a mass air flow (MAF) sensor 120 and a manifold air pressure (MAP) sensor 122 for providing respective signals MAF and MAP to the controller 12.

Further, in the disclosed embodiments, an exhaust gas recirculation (EGR) system may route a desired portion of exhaust gas from the exhaust passage 48 to the intake air passage 46 via an EGR passage 140. As shown in FIG. 1, the EGR passage 140 is fluidly coupled to the intake system 13 at the intake air passage 46, downstream of the throttle 62; alternatively, the EGR passage 140 may be coupled at other points along the intake system 13, such as along the intake passage 44, upstream of the throttle 62 and downstream of the compressors 174. In other embodiments, the EGR passage may connect between the exhaust passage downstream of turbine 176 and the intake passage 42 upstream of compressor 174 in what is known as a low-pressure EGR loop. The amount of EGR provided may be varied by controller 12 via an EGR valve 142. By introducing exhaust gas to the engine 10, the amount of available oxygen for combustion is decreased, thereby reducing combustion flame temperatures and reducing the formation of $NO_x$, for example. As depicted, the EGR system further includes an EGR sensor 144 which may be arranged within the EGR passage 140 and may provide an indication of one or more of pressure, temperature, and concentration of the exhaust gas. Under some conditions, the EGR system may be used to regulate the temperature of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing, such as by controlling a variable valve timing mechanism.

Exhaust passage 48 may receive exhaust gases from other cylinders of engine 10 in addition to cylinder 30. Exhaust gas sensor 126 is shown coupled to exhaust passage 48 upstream of emission control device 178. Sensor 126 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof. Exhaust temperature may be measured by temperature sensor 158 located in exhaust passage 48. Alternatively, exhaust temperature may be inferred based on engine operating conditions such as speed, load, air-fuel ratio (AFR), spark retard, etc. Further, exhaust temperature may be computed by exhaust gas sensors 126. It may be appreciated that the exhaust gas temperature may alternatively be estimated by any combination of temperature estimation methods listed herein.

In one example, the emission control device 178 may be a light-off catalyst. In general, the emission control device 178 is configured to catalytically treat the exhaust flow, and thereby reduce an amount of one or more substances in the exhaust flow. For example, the emission control device 178 may be configured to trap NO from the exhaust flow when the exhaust flow is lean, and to reduce the trapped NO when the exhaust flow is rich. In other examples, the emission control device 178 may be configured to disproportionate NO or to selectively reduce NO with the aid of a reducing agent. In still other examples, the emission control device 178 may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regeneratable soot filter configured to trap and oxidize soot particles in the exhaust flow. In this way, the emission control device 178 may be a diesel particulate filter (DPF), a three way catalyst (TWC), a NOx trap, a NOx catalyst, selective catalytic reduction (SCR) system, various other emission control devices, or combinations thereof. The emission control device 178 may also be referred to as exhaust catalyst and may further include a temperature sensor 177 that may be used for determining the temperature of the exhaust catalyst.

Controller 12 is shown in FIG. 1 as a microcomputer, including a microprocessor unit 102, input/output ports 104, an electronic storage medium for executable programs and calibration values shown as a read-only memory chip 106 in this particular example, random access memory 108, keep alive memory 110, and a data bus. The controller 12 may be in communication with and, therefore, receive various signals from sensors coupled to the engine 10, in addition to those signals previously discussed, including measurement of inducted mass air flow (MAF) from the MAF sensor 120; engine coolant temperature (ECT) from a temperature sensor 112 coupled to a cooling sleeve 114; a profile ignition pickup signal (PIP) from a Hall effect sensor 118 (or other type) coupled to the crankshaft 40; throttle position (TP) from a throttle position sensor; absolute manifold pressure signal, MAP, from the MAP sensor 122; and exhaust constituent concentration from exhaust gas sensor 126. Engine speed signal, RPM, may be generated by controller 12 from signal PIP. Note that various combinations of the above sensors may be used, such as a MAF sensor without a MAP sensor, or vice versa. During stoichiometric operation, this sensor can give an indication of engine torque. Further, this sensor, along with engine speed, can provide an estimate of charge (including air) inducted into the cylinder. In one example, Hall effect sensor 118, which is also used as an engine speed sensor, produces a predetermined number of equally spaced pulses each revolution of the crankshaft.

In addition to the above sensors, a combustion sensor (not shown) may be coupled to an individual cylinder on a per cylinder basis. The combustion sensor may be an appropriate sensor as known in the art for example a knock sensor, a vibration sensor, a temperature sensor, a pressure sensor, etc. or any combination thereof. The combustion sensor may sense combustion relevant parameters such as a peak pressure value, the location of a peak pressure, the timing of a peak pressure, or any combination thereof, for example.

Engine 10 may run at a higher thermal efficiency by utilizing a Miller cycle. A Miller cycle is an engine cycle that may operate a two-stroke engine cycle, including a compression stroke and a combustion stroke, or a four-stroke engine cycle, including an intake stroke, a compression stroke, a combustion stroke, and an exhaust stroke. A Miller cycle may include injecting compressed air into the cylinder 30 of the engine 10 via the multi-stage turbocharger arrangement 2, while employing modified intake valve timing, in order to provide a smaller, compressed volume of air during the engine cycle. For example, during a Miller cycle as part of a four-stroke engine cycle, a compression stroke may operate with a modified intake valve timing, whereby the intake valve 52 may have a delayed closing from the intake stroke such that it is open during a beginning portion of the compression stroke, and the multi-stage turbocharger arrangement 2 may send compressed air into the cylinder 30 during this beginning portion of the compression stroke. The delayed closing of the intake valve 52 may allow for a smaller volume of air in the cylinder 30, thereby reducing the load on the piston 36. Additionally, injection of the compressed air into the cylinder 30 by the multi-stage turbocharger arrangement 2 provides a larger mass of air and fuel to the cylinder than would have been ingested with a naturally aspirated engine. The external compression by the turbocharger system allows for the removal of heat from the air charge using a charge-air-cooler (not pictured) after it is compressed, but before it enters the cylinder. The remaining compression is provided by the piston 36 during a latter part of the compression stroke when both the intake valves 52 and the exhaust valves 54 are closed. By providing compressed air to the cylinder 30 while reducing the load on the piston 36 during the compression stroke, the effective compression ratio (the ratio of volume of gases in the cylinder at intake valve closing of the compression stroke (or intake stroke in the case of early intake valve closing (EIVC)) to the volume of gases in the cylinder at TDC of the compression stroke) is reduced, while the effective expansion ratio (the ratio of volume of gases in the cylinder at TDC of the combustion stroke to the volume of gases in the cylinder at BDC of the combustion stroke) remains the same. By using a Miller cycle, the effective compression ratio of the cylinder 30 may be reduced while maintaining the expansion ratio of the cylinder, thereby increasing thermal efficiency of engine 10 while reducing the propensity for knock that may occur at high effective compression ratios. During the Miller cycle, one turbocharger of the multi-stage turbocharger arrangement 2 may be fed exhaust gas from a set of three cylinders that fire at even 240° crank angle intervals, while the other turbocharger of the multi-stage turbocharger arrangement 2 may be fed exhaust gas from the other set of three cylinders, also firing at even 240° crank angle intervals. Operation of each of the turbochargers of the multi-stage turbocharger arrangement 2 in parallel firing at even intervals may reduce exhaust pulse interference, reducing backpressure pulses on the cylinders.

The storage medium read-only memory chip 106 can be programmed with non-transitory, computer readable data representing instructions executable by the microprocessor unit 102 for performing the routines described below as well as other variants that are anticipated but not specifically listed. An example routine for operation of the multi-stage turbocharger arrangement 2 are described herein with reference to FIG. 4.

In some examples, vehicle 100 may be a hybrid vehicle with multiple sources of torque available to one or more vehicle wheels 155. In other examples, vehicle 100 is a conventional vehicle with only an engine. In the example shown, vehicle 100 includes engine 10 and an electric machine 152. Electric machine 152 may be a motor or a motor/generator. Crankshaft 40 of engine 10 and electric machine 152 are connected via a transmission 154 to vehicle wheels 155 when one or more clutches 156 are engaged. In the depicted example, a first clutch 156 is provided between crankshaft 40 and electric machine 152, and a second clutch 156 is provided between electric machine 152 and transmission 154. Controller 12 may send a signal to an actuator of each clutch 156 to engage or disengage the clutch, so as to connect or disconnect crankshaft 40 from electric machine 152 and the components connected thereto, and/or connect or disconnect electric machine 152 from transmission 154 and the components connected thereto. Transmission 154 may be a gearbox, a planetary gear system, or another type of transmission. The powertrain may be configured in various manners including as a parallel, a series, or a series-parallel hybrid vehicle.

Electric machine 152 receives electrical power from a traction battery 160 to provide torque to vehicle wheels 155. Electric machine 152 may also be operated as a generator to provide electrical power to charge battery 160, for example during a braking operation.

FIG. 2 depicts a schematic example of an engine system 200, including a dual turbocharger system 201 for an I6 engine. Engine system 200 of FIG. 2 may be the same as or significantly similar to engine 10 of FIG. 1. Similarly, dual turbocharger system 201 may be the same or significantly similar to turbocharger arrangement 2 of FIG. 1. Engine system 200 depicts a cylinder bank 202 including a first set of cylinders 204 and a second set of cylinders 206. The first set of cylinders 204 may be fluidly coupled to a first part 208 of an exhaust manifold (such as exhaust manifold 148 of FIG. 1), and the second set of cylinders 206 may be fluidly coupled to a second part 210 of the exhaust manifold, with the first part 208 and the second part 210 of the exhaust manifold fluidly separate from each other. Each of the first part 208 of the exhaust manifold and the second part 210 of the exhaust manifold couple the cylinder bank 202 to the dual turbocharger system 201.

In particular, the first part 208 of the exhaust manifold may be fluidly coupled to a first turbine 218 (also referred to herein as a first VGT) of a first turbocharger 205 via a first turbine inlet 214. The first turbocharger 205 may include the first turbine 218 and a first compressor 222 mechanically coupled together via a first driveshaft 220, the first compressor 222 driven by rotation of the turbine 218. In one example, the first turbine 218 of the first turbocharger 205 may be a variable geometry turbine (VGT), whereby vanes included in the first turbine 218 may have an adjustable angle, allowing an effective aspect ratio of the vanes to be adjusted either actively or passively based on engine operating conditions (e.g. engine speed, engine load, temperature, etc.). In another example, the first turbine 218 may be a VGT whereby input to the first turbine 218 may be mediated by an orifice of a variable size, the size of the orifice adjustable either actively or passively based on engine operating conditions. The first turbine 218 may be fluidly coupled to an output channel 224, the output channel 224 disposed downstream of the first turbine 218. A first EGR passage (not shown) may be fluidly coupled to the output channel 224 downstream of the first turbine 218, the first EGR passage configured to route low pressure EGR from downstream of the first turbine 218 to upstream of the first compressor 222 in an intake passage (such as intake passage 44 of FIG. 1).

A first waste gate (WG) 250 may fluidly couple the first turbine inlet 214 and the output channel 224, and may be configured to route air from the first turbine inlet 214 to the output channel 224, thereby bypassing the first turbine 218. The first WG 250 may be actively operated, serving as an actuator (valve), by an electrical or vacuum valve supply system (not shown). Full or partial opening of the first WG 250 may reduce boost pressure by reducing driving of the first turbine 218 by exhaust from the first turbine inlet 214. The first WG 250 may be used in conjunction with variable geometry of the first turbine 218 in order to control boost pressure. The first turbine may include either a variable geometry mechanism or a waste gate, or both. Active control of valves within dual turbocharger system 201 may be achieved via a controller (such as controller 12 of FIG. 1).

The first compressor 222 may be fluidly coupled to an ambient air intake line 212 upstream of the first compressor, and may also be fluidly coupled to an output channel 226 downstream of the first compressor 222. A first compressor recirculation valve (CRV) 216 may fluidly couple each of the ambient air intake line 212 and the output channel 226, and may be configured to route output air charge of the first compressor 222 to be fed back to the first compressor 222 upstream of the first compressor 222, in order to reduce the pressure at an output of the first compressor 222 to prevent compressor surge. The first CRV 216 may also be actively controlled, serving as an actuator (valve) for the first turbocharger 205, by an electrical or vacuum valve supply system (not shown). The output channel 226 may be fluidly coupled to a first charge air cooler (CAC) 230 downstream of the output channel 226. Additionally, the first compressor 222 may include one or more sensors coupled to the input and the output of the first compressor, in order to determine operating conditions. As an example, the first compressor 222 may include an inlet pressure sensor (not shown), an output pressure sensor (not shown), and an output mass air flow (MAF) sensor (not shown), in order to determine the operating conditions of the first compressor for e.g. detection of compressor surge conditions. Each of the sensors may be communicatively coupled to a controller (such as controller 12 of FIG. 1), in that they may send signals to the controller of estimated pressure and MAF values.

Similarly, the second part 210 of the exhaust manifold may be fluidly coupled to a second turbine 238 (also referred to herein as a second VGT) of a second turbocharger 207. In particular, the second part 210 of the exhaust manifold may be fluidly coupled to a second turbine 238 of a second turbocharger 207 via a second turbine inlet 228. The second turbocharger 207 may include the second turbine 238 and the second compressor 236 mechanically coupled together via a second driveshaft 242, the second compressor 236 driven by rotation of the second turbine 238. In one example, the second turbine 238 of the second turbocharger 207 may be a variable geometry turbine (VGT), whereby vanes included in the second turbine 238 may have an adjustable angle, allowing an effective aspect ratio of the vanes to be adjusted either actively or passively based on engine operating conditions (e.g. engine speed, engine load, temperature, etc.). In another example, the second turbine 238 may be a VGT whereby input to the second turbine 238 may be mediated by an orifice of a variable size, the size of the orifice adjustable either actively or passively based on engine operating conditions. A second EGR passage (not shown) may be configured to route low pressure EGR from downstream of the second turbine 238 to upstream of the first compressor 222 in an intake passage (such as intake passage 44 of FIG. 1).

A second waste gate (WG) 252 may fluidly couple each of the second turbine inlet 228 and the output channel 240, and may be configured to route air from the second turbine inlet 228 to the output channel 240, thereby bypassing the second turbine 238. The second WG 252 may be actively operated, serving as an actuator (valve), by an electrical or vacuum valve supply system (not shown). Full or partial opening of the second WG 252 may reduce boost pressure by reducing driving of the second turbine 238 by exhaust from the second turbine inlet 228. The second WG 252 may be used in conjunction with variable geometry of the second turbine 238 in order to control boost pressure. The second turbine may include either a variable geometry mechanism or a waste gate, or both. Active control of valves within dual turbocharger system 201 may be achieved via a controller (such as controller 12 of FIG. 1).

The second compressor 236 may be fluidly coupled to a second compressor inlet 232 downstream of each of the first compressor 222 and the first charge air cooler (CAC) 230, and may also be fluidly coupled to an output channel 244 downstream of the second compressor 236. In contrast to the first and second turbines 218, 238, which operate in parallel and are of the same size, the first and second compressors 222, 236 are coupled in series, with the diameter of the first compressor being greater than the diameter of the second compressor, such that the first compressor may be a lower pressure compressor, while the second compressor may be a higher pressure compressor. By having the first compressor 222 having a larger diameter (e.g. generating lower pressure) than the second compressor 236, the dual turbocharger system 201 may be able to compensate for lower density at the ambient air intake line 212, thereby allowing more efficient operation of the dual turbocharger system 201. Additionally, since the VGT expansion ratio (e.g. a ratio of a turbine inlet pressure to an ambient pressure) is largely independent of turbine speed, an equivalent P3 pressure (e.g. the pressure between a turbine inlet and an output channel of a turbine) may be maintained, even though the first and second turbines 218, 238, may run at different speeds. A second compressor recirculation valve (CRV) 234 may fluidly couple each of the second compressor inlet 232 and the output channel 244, and may be configured to route output air charge of the second compressor 236 to be fed back to the second compressor 236 upstream of the second compressor 236, in order to reduce the pressure at an output of the second compressor 236 to prevent compressor surge. However, in other embodiments, the first CRV 216 and the second CRV 234 may be removed and replaced by a single CRV that connects from output channel 244 or intake passage 248 to the ambient air intake line 212. The second compressor recirculation valve 263 may also be actively controlled, serving as an actuator (valve) for the second turbocharger 207, by an electrical or vacuum valve supply system (not shown). The output channel 244 may be fluidly coupled to a second CAC 246 downstream of the output channel 244, the second CAC 246 fluidly coupled to an intake passage 248 leading to the intake system, the intake passage downstream of the second CAC. Additionally, the second compressor 236 may include one or more sensors coupled to the input and the output of the first compressor, in order to determine operating conditions. As an example, the second compressor 236 may include an inlet pressure sensor (not shown), an output pressure sensor (not shown), and an output mass air flow (MAF) sensor (not shown), in order to determine the operating conditions of the first compressor for e.g. detection of compressor surge conditions. Each of the sensors may be communicatively coupled to the controller, in that they may send signals to the controller of estimated pressure and MAF values.

Operation of the dual turbocharger system 201 may be as follows. Exhaust leaving the cylinder bank 202 of the engine system 200 may drive each of the turbines 218, 238, with exhaust flowing from each of the first part 208 of the exhaust manifold and the second part 210 of the exhaust manifold into the first and second turbine inlets 214, 228, respectively. Each of the first and second turbines 218, 238, may then drive the first and second compressors 222, 236 via the first and second driveshafts 220, 242, respectively. Output of each of the first and second turbines 218, 238, may then be fluidically connected to an aftertreatment system such as 178 of FIG. 1, and optionally to an EGR passage or passages to be recirculated in the engine system 200. In this way, each of the first and second turbines 218, 238, may be operated in parallel.

In order to control the amount of boost provided during engine operation, in one example, the amount of exhaust flow to each of the first and second turbines 218, 238, may be actively controlled by the first and second WGs 250, 252, respectively. Full or partial opening of the WGs may reduce boost pressure by reducing driving of the respective turbines by exhaust provided by the exhaust manifold. The WGs may be operated independently depending on engine operating conditions. For example, the first WG 250 may be partially or fully opened while the second WG 252 may remained closed, or vice versa. As another example, during high engine load conditions, both WGs may remain closed in order to provide large amounts of boost. The WGs may optionally be used for active control of boosting in conjunction with the active (or passive) control provided by the variable geometry of the first and second turbines 218, 238, in order to provide further control over boosting over a range of engine operating conditions. Details of operation of the first and second WGs 250, 252, in addition to operation of the first and second turbines 218, 238, are further provided in relation to FIG. 4.

In contrast, the first and second compressors 222, 236, may operate in series. In particular, ambient air may enter the dual turbocharger system 201 via the ambient air intake line 212, and may flow into the first compressor 222, generating a compressed air charge output. Air charge output of the first compressor 222 may then flow via output channel 226 through the first CAC 230, whereby the air charge output is cooled. The first CAC 230 extracts heat from the air charge prior to the second stage, which may allow the second compressor 236 to work more efficiently, while also avoiding excessive air temperature after the second compressor. Following heat extraction of the compressed air charge at the first CAC 230, the compressed air charge may then flow into the second compressor 236 via second compressor inlet 232, generating further compressed air charge output. Air charge output of the second compressor 236 may then flow via output channel 244 through the second CAC 246, whereby the air charge output is further cooled. Following cooling at the second CAC 246, the twice-compressed charge air may then be circulated to the intake manifold via the intake passage 248 to provide boosted operation of the engine system 200.

In order to prevent compressor surge during engine operation, the pressure at the output of each of the first and second compressors 222, 236, may be controlled by the first and second CRVs 216, 234, respectively. Compressor surge may occur when a pressure ratio of the first compressor (e.g. the ratio of the output pressure to the inlet pressure, also termed first compressor ratio) is too great relative to the flow of air through the first compressor. In particular, compressor surge may be characterized by axial airflow through a compressor during boost periodically decreasing or reversing, and may be induced by a lack of sufficient airflow downstream of the compressor. In one example, compressor surge may occur when a throttle (such as throttle 62 of FIG. 1) is closed during boosting via the dual turbocharger system 201, creating a backflow of compressed air from upstream of a compressor flowing back to the compressor. In another example, compressor surge may occur when the throttle is open, but there is insufficient air flow to the intake system during boosting conditions. A backflow of compressed air to the compressor may cause compressor stall, and may damage the compressor. In order to counteract compressor surge during boosting within the dual turbocharger system 201, the first and second CRVs 216, 234, may be included at the first and second compressors 222, 236, respectively. Each of the CRVs may recirculate compressed air from the output channels to the input channels of the respective compressors, allowing a decrease of pressure at the respective compressor output channels, thereby reducing a backflow of air into the compressors downstream of the compressors, reducing compressor surge. The CRVs may be operated independently of each other depending on engine operating conditions. For example, the first CRV 216 may be partially or fully opened while the second CRV 234 may remained closed, or vice versa. Details of operation of the first and second CRVs 216, 234, are further provided in relation to FIG. 4.

FIG. 3 shows a schematic example of an engine system 300, including a dual turbocharger system 301 for a V6 engine 302. In contrast to an I6 engine, where the cylinders are packaged in a single in-line cylinder bank, a V6 engine contains two 3-cylinder cylinder banks driven by a single crankshaft defining a longitudinal axis, the two cylinder banks offset azimuthally from each other along the longitudinal axis of the crankshaft. Engine system 300 of FIG. 3 may be the same or significantly similar to the engine 10 of FIG. 1. Similarly, dual turbocharger system 301 may be the same or significantly similar to turbocharger arrangement 2 of FIG. 1. Engine system 300 includes the V6 engine 302, including a first cylinder bank 304 with a first set of cylinders 308 and a second cylinder bank 306 with a second set of cylinders 310, the number of cylinders in each of the first cylinder bank 304 and the second cylinder bank 306 being the same. The first set of cylinders 308 may be fluidly coupled to a first part 312 of an exhaust manifold (such as exhaust manifold 148 of FIG. 1), and the second set of cylinders 310 may be fluidly coupled to a second part 314 of the exhaust manifold, with the first part 312 and the second part 314 of the exhaust manifold fluidly uncoupled to each other between the cylinder bank 202 and turbines 320, 344. Each of the first part 312 of the exhaust manifold and the second part 314 of the exhaust manifold fluidly couple the cylinder banks 304, 306 to the dual turbocharger system 301.

In particular, the first part 312 of the exhaust manifold may be fluidly coupled to a first turbine 320 (also referred to herein as a first VGT) of a first turbocharger 305 via a first turbine inlet 316. The first turbocharger 305 may include the first turbine 320 and the first compressor 324 mechanically coupled together via a first driveshaft 322, the first compressor 324 driven by rotation of the turbine 320. In one example, the turbine 320 of the first turbocharger 305 may be a variable geometry turbine (VGT), whereby vanes included in the first turbine 320 may have an adjustable angle, allowing an effective aspect ratio of the vanes to be adjusted either actively or passively based on engine operating conditions (e.g. engine speed, engine load, temperature, etc.). In another example, the first turbine 320 may be a VGT whereby input to the first turbine 320 may be mediated by an orifice of a variable size, the size of the orifice adjustable either actively or passively based on engine operating conditions. The first turbine 320 may be fluidly coupled to an output channel 328, the output channel 328 disposed downstream of the first turbine 320. A first EGR passage (not shown) may be fluidly coupled to the output channel 328 downstream of the first turbine 320, the first EGR passage configured to route low pressure EGR from downstream of the first turbine 320 to upstream of the first compressor 324 in an intake passage (such as intake passage 44 of FIG. 1).

A first waste gate (WG) 354 may fluidly couple each of the first turbine inlet 316 and the output channel 328, and may be configured to route air from the first turbine inlet 316 to the output channel 328, thereby bypassing the first turbine 320. The first WG 354 is actively operated, serving as an actuator (valve), by an electrical or vacuum valve supply system (not shown). Full or partial opening of the first WG 354 may reduce boost pressure by reducing driving of the first turbine 320 by exhaust from the first turbine inlet 316. The first WG 354 may be used in conjunction with variable geometry of the first turbine 320 in order to control boost pressure. Active control of valves within dual turbocharger system 301 is achieved via a controller (such as controller 12 of FIG. 1).

The first compressor 324 may be fluidly coupled to an ambient air intake line 330 upstream of the first compressor, and may also be fluidly coupled to an output channel 332 downstream of the first compressor 324. A first compressor recirculation valve (CRV) 326 may fluidly couple each of the ambient air intake line 330 and the output channel 332, and may be configured to route output air charge of the first compressor 324 to be fed back to the first compressor 324 upstream of the first compressor 324, in order to reduce the pressure at an output of the first compressor 324 to prevent compressor surge. The first compressor recirculation valve 326 may also be actively controlled, serving as an actuator (valve) for the first turbocharger 305, by an electrical or vacuum valve supply system (not shown). The output channel 332 may be fluidly coupled to a first charge air cooler (CAC) 334 downstream of the output channel 332. Additionally, the first compressor 324 may include one or more sensors coupled to the input and the output of the first compressor, in order to determine operating conditions. As an example, the first compressor 324 may include an inlet pressure sensor (not shown), an output pressure sensor (not shown), and an output mass air flow (MAF) sensor (not shown), in order to determine the operating conditions of the first compressor for e.g. detection of compressor surge conditions. Each of the sensors may be communicatively coupled to the controller, in that they may send signals to the controller of estimated pressure and MAF values.

Similarly, the second part 314 of the exhaust manifold may be fluidly coupled to a second turbine 344 (also referred to herein as a second VGT) of a second turbocharger 307. In particular, the second part 314 of the exhaust manifold may be fluidly coupled to a second turbine 344 of a second turbocharger 307 via a second turbine inlet 318. The second turbocharger 307 may include the second turbine 344 and the second compressor 346 mechanically coupled together via a second driveshaft 342, the second compressor 346 driven by rotation of the second turbine 344. In one example, the second turbine 344 of the second turbocharger 307 may be a variable geometry turbine (VGT), whereby vanes included in the second turbine 344 may have an adjustable angle, allowing an effective aspect ratio of the vanes to be adjusted either actively or passively based on engine operating conditions (e.g. engine speed, engine load, temperature, etc.). In another example, the second turbine 344 may be a VGT whereby input to the second turbine 344 may be mediated by an orifice of a variable size, the size of the orifice adjustable either actively or passively based on engine operating conditions. A second EGR passage (not shown) may be fluidly coupled to the output channel 338 downstream of the second turbine 344, the second EGR passage configured to route low pressure EGR from downstream of the second turbine 344 to upstream of the first compressor 324 in an intake passage (such as intake passage 44 of FIG. 1).

A second waste gate (WG) 356 may fluidly couple each of the second turbine inlet 318 and the output channel 338, and may be configured to route exhaust gas from the second turbine inlet 318 to the output channel 338, thereby bypassing the second turbine 344. The second WG 356 is actively operated, serving as an actuator (valve), by an electrical or vacuum valve supply system (not shown). Full or partial opening of the second WG 356 may reduce boost pressure by reducing driving of the second turbine 344 by exhaust from the second turbine inlet 318. The second WG 356 may be used in conjunction with variable geometry of the second turbine 344 in order to control boost pressure. Active control of valves within dual turbocharger system 301 is achieved via a controller (such as controller 12 of FIG. 1).

The second compressor 346 may be fluidly coupled to a second compressor inlet 336 downstream of each of the first compressor 324 and the first CAC 334, and may also be fluidly coupled to an output channel 348 downstream of the second compressor 346. In contrast to the first and second turbines 320, 344, which operate in parallel and are of the same size, the first and second compressors 324, 346 are coupled in series, with the diameter of the first compressor being greater than the diameter of the second compressor, such that the first compressor may be a lower pressure compressor, while the second compressor may be a higher pressure compressor. By having the first compressor 324 having a larger diameter (e.g. generating lower pressure) than the second compressor 346, the dual turbocharger system 301 may be able to compensate for lower density at the ambient air intake line 330, thereby allowing more efficient operation of the dual turbocharger system 301. Additionally, since the VGT expansion ratio (e.g. a ratio of a turbine inlet pressure to an outlet pressure) is largely independent of turbine speed, an equivalent P3 may be maintained, even though the first and second turbines 320, 344, are run at different speeds. A second compressor recirculation valve (CRV) 340 may fluidly couple each of the second compressor inlet 336 and the output channel 348, and may be configured to route output air charge of the second compressor 346 to be fed back to the second compressor upstream of the second compressor, in order to reduce the pressure at an output of the second compressor to prevent compressor surge. However, in other embodiments, the first CRV 326 and the second CRV 340 may be removed and replaced by a single CRV that connects from output channel 348 or intake passage 352 to the ambient air intake line 330. The second compressor recirculation valve 340 may also be actively controlled, serving as an actuator (valve) for the second turbocharger 307, by an electrical or vacuum valve supply system (not shown). The output channel 348 may be fluidly coupled to a second CAC 350 downstream of the output channel 348, the second CAC 350 fluidly coupled to the intake passage 352 leading to an intake system, the intake passage downstream of the second CAC. Additionally, the second compressor 346 may include one or more sensors coupled to the input and the output of the first compressor, in order to determine operating conditions. As an example, the second compressor 346 may include an inlet pressure sensor (not shown), an output pressure sensor (not shown), and an output mass air flow (MAF) sensor (not shown), in order to determine the operating conditions of the second compressor for e.g. detection of compressor surge conditions. Each of the sensors may be communicatively coupled to the controller, in that they may send signals to the controller of estimated pressure and MAF values.

In this way, the dual turbocharger system 301 of the engine system 300 may include a first turbocharger 305 including a first turbine 320 configured to receive exhaust gas from a first cylinder bank 304, and a first, larger compressor 324, and a second turbocharger 307 including a second turbine 344 configured to receive exhaust gas from a second cylinder bank 306, and a second, smaller compressor 346, the first turbine 320 parallel to the second turbine 344 while the first, larger compressor 324 is in series with the second, smaller compressor 346.

Operation of the dual turbocharger system 301 may be as follows. Exhaust leaving the first and second set of cylinders 308, 310 of the V6 engine 302 may drive each of the first and second turbines 320, 344, respectively, with exhaust flowing from each of the first part 312 of the exhaust manifold and the second part 314 of the exhaust manifold into the first and second turbine inlets 316, 318, respectively. Each of the first and second turbines 320, 344, may then drive the first and second compressors 324, 346 via the first and second driveshafts 322, 342, respectively. A portion of output of each of the first and second turbines 320, 344, may then be recirculated in the engine system 300 via output channels 328, 338 e.g. via a first EGR passage and a second EGR passage, respectively, with the rest of the exhaust gas flowing into an after treatment system (such as emission control device 178 of FIG. 1), after which the treated exhaust may be vented to atmosphere. In this way, each of the first and second turbines 320, 344, may be operated in parallel.

In order to control the amount of boost provided during engine operation, in one example, the amount of exhaust flow to each of the first and second turbines 320, 344 may be actively controlled by the first and second WGs 354, 356, respectively. Full or partial opening of the first and second WGs 354, 356 may reduce boost pressure by reducing driving of the respective first and second turbines 320, 344 by exhaust provided by the exhaust manifold. The first and second WGs 354, 356 may be operated independently depending on engine operating conditions. For example, the first WG 354 may be partially or fully opened while the second WG 356 may remained closed, or vice versa. As another example, during high engine load conditions, both the first and second WGs 354, 356 may remain closed in order to provide large amounts of boost. The first and second WGs 354, 356 may optionally be used for active control of boosting in conjunction with the active (or passive) control provided by the variable geometry of the first and second turbines 320, 344, in order to provide further control over boosting over a range of engine operating conditions.

Figure 4:
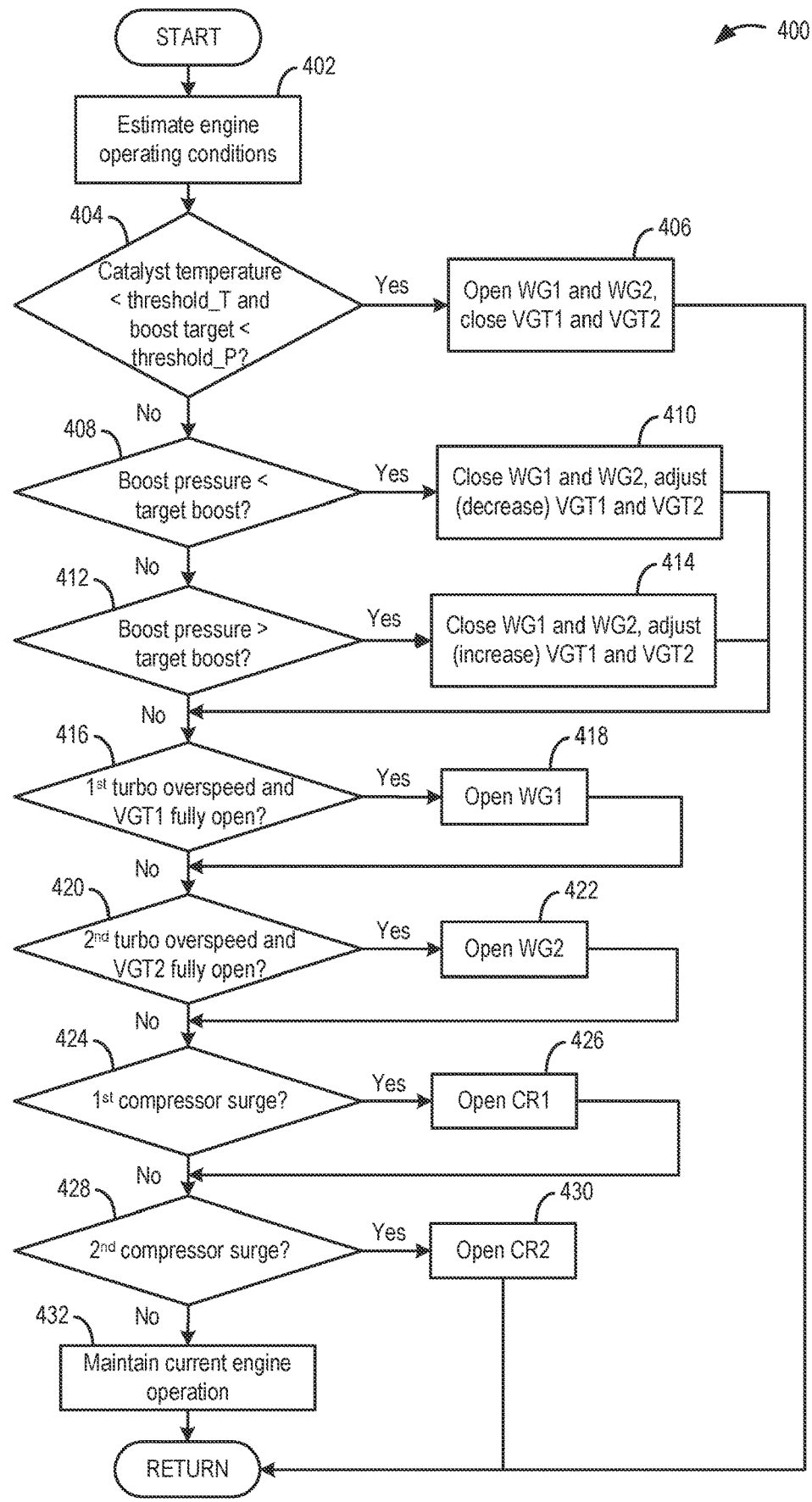
FIG. 4 shows a flowchart of an example method for operating the dual turbocharger systems of FIGS. 2, 3, according to the present disclosure.
Figure 5:
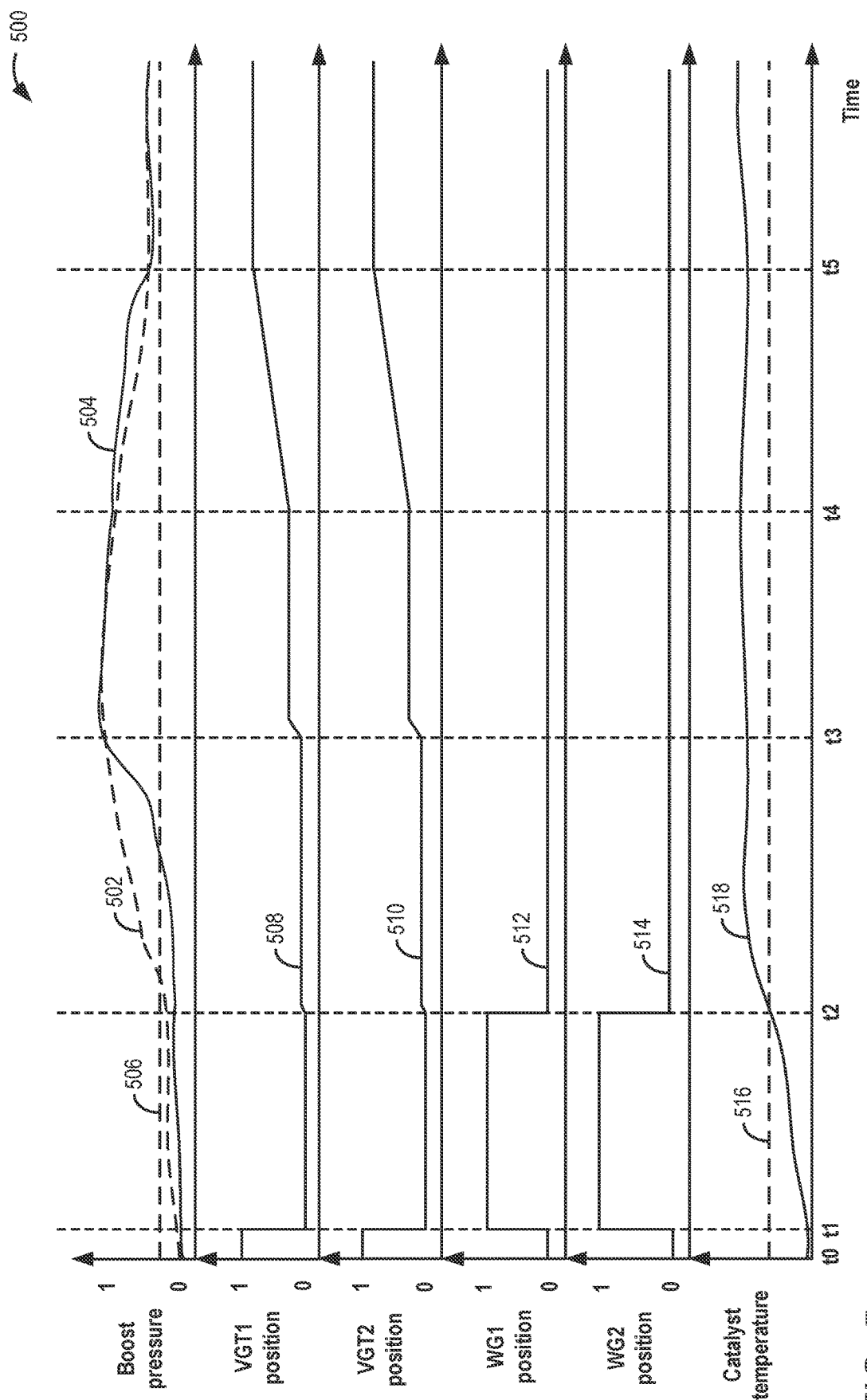
FIG. 5 shows an example timeline of operation of the waste gates (WGs) and corresponding variable geometry turbines (VGTs) in response to a target boost pressure, according to the example method of FIG. 4.

Details of operation of the first and second WGs 354, 356, in addition to operation of the first and second turbines 320, 344, are further provided in relation to FIG. 4.

In contrast, the first and second compressors 324, 346 may operate in series. In particular, ambient air may enter the dual turbocharger system 301 via the ambient air intake line 330, and may flow into the first compressor 324, generating a compressed air charge output. Air charge output of the first compressor 324 may then flow via output channel 332 through the first CAC 334, whereby the air charge output is cooled. The first CAC 334 extracts heat from the air charge prior to the second stage, which may allow the second compressor 346 to work more efficiently, while also avoiding excessive air temperature after the second compressor. Following heat extraction of the compressed air charge at the first CAC 334, the compressed air charge may then flow into the second compressor 346 via second compressor inlet 336, generating further compressed air charge output. Air charge output of the second compressor 346 may then flow via output channel 348 through the second CAC 350, whereby the air charge output is further cooled. Following cooling at the second CAC 350, the twice-compressed charge air may then be circulated to the intake manifold via the intake passage 352 to provide boosted operation of the engine system 300.

In order to prevent compressor surge during engine operation, the pressure at the output of each of the first and second compressors 324, 346 may be controlled by the first and second CRVs 326, 340, respectively. Each of the first and second CRVs 326, 340 may recirculate compressed air from the output channels to the input channels of the respective compressors, allowing a decrease of pressure at the respective compressor output channels, thereby reducing a backflow of air into the compressors downstream of the compressors, reducing compressor surge. The first and second CRVs 326, 340 may be operated independently depending on engine operating conditions. For example, the first CRV 326 may be partially or fully opened while the second CRV 340 may remained closed, or vice versa. Details of operation of the CRVs 326, 340, are further provided in relation to FIG. 4.

FIG. 4 shows a method 400 for operating a dual turbocharger system (such as dual turbocharger systems 201 and 301 of FIGS. 2, 3, and multi-stage turbocharger arrangement 2 of FIG. 1, respectively) of an engine (such as engine 10 of FIG. 1). Method 400 and all other methods described herein will be described in reference to the systems described herein and with regard to FIGS. 1-3, but it should be understood that similar methods may be applied to other systems without departing from the scope of this disclosure. Method 400 and all other methods described herein may be carried out by a control system (e.g., controller 12 of FIG. 1), and may be stored at controller in non-transitory memory. Instructions for carrying out method 400 and all other method described herein may be executed by the controller in conjunction with signals received from sensors of an engine system of the vehicle, such as the sensors described above with reference to FIG. 1. The controller may employ engine actuators of the engine system to adjust operation of an engine of the vehicle, according to the methods described below.

At 402, method 400 includes estimating engine operating conditions. Estimating engine operating conditions may involve estimating the engine load and engine speed. As explained in relation to FIG. 1, a profile ignition pickup signal (PIP) from a sensor (such as Hall effect sensor 118 of FIG. 1) coupled to the crankshaft (such as crankshaft 40 of FIG. 1) may be used to determine the engine speed or RPM of the engine. Engine load may be determined through air flow measurements via a MAF sensor (such as MAF sensor 120 of FIG. 1). Additionally, manifold air pressure may be estimated via a MAP sensor (such as MAP sensor 122 of FIG. 1), in order to determine e.g. boost pressure. Engine operating temperature may also be determined via a temperature sensor (such as temperature sensor 112 of FIG. 1). Properties of the exhaust gas upstream of an emission control device (such as emission control device 178 of FIG. 1), such as the exhaust gas air/fuel ratio may be determined via an exhaust gas sensor (such as exhaust gas sensor 126 of FIG. 1). Properties at the emission control device may be also estimated, such as temperature of the emission control device via a temperature sensor (such as temperature sensor 177 of FIG. 1). Additionally, properties of the EGR, such as one or more of temperature, pressure and concentration of exhaust gas may be determined by EGR sensor 144. Further ambient conditions such as ambient temperature and humidity may be estimated.

At 404, method 400 may include determining if a temperature of the emission control device (also referred to herein as the catalyst temperature) is greater than a threshold temperature, and determining if a target level of boost is greater than a threshold boost pressure. The threshold temperature may be a temperature below which the emission control device may reduce emissions generated from exhaust with high efficiency. In one example, the threshold temperature may be a light-off temperature of the emission control device, such that if the temperature of the emission control device is above the light-off temperature, catalytic conversion within the emission control device is greater than 50%. Operation of the engine with cool exhaust aftertreatment components may allow for the possibility of large emissions due to inefficiency of the emission control device; such a situation may occur when the engine is operating from a cold-start condition, for example. Therefore, it may be desirable to increase the exhaust temperature to beyond the threshold temperature, in order to allow efficient operation of the emission control device, in addition to allowing for a greater degree of control of the boost via turbochargers of the dual turbocharger system. The emission control device temperature may be determined via the temperature sensor included on the emission control device, as described in relation to 402 or in other embodiments the emissions control device temperature may be estimated with a model.

Additionally, it may be determined whether the target level of boost is greater than the threshold boost pressure. The threshold boost pressure may be a pre-calibrated threshold set for operating conditions at which it is no longer possible to meet the driver demand for performance while simultaneously bypassing the turbines for heating emissions control devices. In order for a Miller cycle to operate effectively, the cylinders (such as cylinder 30 of FIG. 1) may utilize more compressed air in order to compensate for a reduced load on a piston (such as piston 36 of FIG. 1), as described in relation to FIG. 1. In one example, the threshold boost pressure may be a mathematical function based on the exhaust and/or engine operating temperature, to be computed by the controller. In another example, the threshold boost pressure may be a look-up table stored in the controller memory, where the estimated exhaust and/or engine operating temperatures may be used as input to generate a threshold boost pressure as an output. The target level of boost may be a dynamical, desired level of boost to be generated during engine operation, e.g. as set by parameters (such as the desired pressure ratio) of the Miller cycle, and additionally in response to torque demand, e.g. as indicated by a position of a pedal position sensor (such as pedal position sensor 134 of FIG. 1) for generating a proportional pedal position signal PP. The target level of boost may then be used to determine if the boost pressure is at the desirable level, with the boost pressure determined by manifold pressure measurements via the MAP sensor, as described in 402.

If it is determined that both the catalyst temperature is less than the threshold temperature, and that the target level of boost is less than the threshold boost pressure, at 406, method 400 may include opening each of a first waste gate (WG) (such as first WGs 250, 354 of FIGS. 2, 3, respectively or other turbine bypass devices) and a second WG (such as second WGs 252, 356 of FIGS. 2, 3, respectively or other turbine bypass devices), in addition to closing each of a first variable geometry turbine (VGT) (such as first turbines 218, 320 of FIGS. 2, 3, respectively) of a first turbocharger (such as first turbocharger 205, 305 of FIGS. 2, 3, respectively) and a second VGT (such as second turbines 238, 344 of FIGS. 2, 3, respectively) of a second turbocharger (such as second turbochargers 207, 307 of FIGS. 2, 3, respectively). Opening each of the first WG and the second WG, while closing each of the first VGT and the second VGT, may allow for a maximum level of heat from the exhaust to be delivered to the emission control device, in order to heat up the emission control device for efficient catalytic conversion, such as at a cold-start of an engine. Following opening of each of the first WG, the second WG, and closing each of the first VGT and second VGT, method 400 may then end.

If it is determined that either the catalyst temperature is greater than or equal to the threshold temperature, or that the target level of boost is greater than or equal to the threshold boost pressure, or both, then at 408, method 400 may go on to determine if the boost pressure is less than the target level of boost. The boost pressure may be determined by the manifold pressure measurements taken in 402 via the MAP sensor.

If the boost pressure is less than the target level of boost, then at 410, method 400 may proceed to close each of the first WG and the second WG, and adjust (decrease) each of the first VGT and the second VGT. Adjusting the VGTs may include adjusting the vanes of the respective VGTs, thereby changing the aspect ratio of the respective VGTs. Decreasing a VGT may include reducing the aspect ratio of a VGT. By reducing the aspect ratio of a VGT, the velocity of the gas flow may be increased, building pressure and turbine speed more quickly, thereby inducing higher pressure to be generated at a compressor of the turbocharger (such as first compressors 222, 324, and second compressors 236, 346 of FIGS. 2, 3, respectively). Therefore, by reducing aspect ratios of each of the first VGT and the second VGT, the boost pressure may be raised. Additionally, each of the first VGT and the second VGT may be adjusted identically, where "identically" refers to an adjustment in aspect ratio of each of the first VGT and the second VGT which is substantially similar throughout the time interval of adjustment of each of the first VGT and the second VGT, such as within a 1% deviation, in order to maintain the same aspect ratio, and therefore the same turbine inlet pressure and turbine pressure ratio at each VGT. Adjustment of each of the first VGT and the second VGT may include feedforward open loop control and/or feedback closed loop control. In one example, the feedforward control may be based on signals received from turbine position sensors (not shown) included within each of the first VGT of the first turbocharger and the second VGT of the second turbocharger. In another example, the feedback control may be based on the manifold pressure measurements takin in 402 via the MAP sensor. Method 400 may then proceed to 416.

If it is determined that the boost pressure is not less than the target level of boost, then at 412, method 400 may go on to determine if the boost pressure is greater than the target level of boost. The boost pressure may be determined by the manifold pressure measurements taken in 402 via the MAP sensor.

If the boost pressure is greater than the target level of boost, then at 414, method 400 may proceed to close each of the first WG and the second WG, and adjust (increase) each of the first VGT and the second VGT. Adjusting the VGTs may include adjusting the vanes of the respective VGTs, thereby changing the aspect ratio of the respective VGTs. Increasing a VGT may include increasing the aspect ratio of a VGT. By increasing the aspect ratio of a VGT, the velocity of the gas flow may be reduced, reducing pressure and turbine speed, thereby inducing lower pressure to be generated at a compressor of the turbocharger. Therefore, by increasing aspect ratios of each of the first VGT and the second VGT, the boost pressure may be lowered. Additionally, each of the first VGT and the second VGT may be adjusted identically, where "identically" refers to an adjustment in aspect ratio of each of the first VGT and the second VGT which is substantially similar throughout the time interval of adjustment of each of the first VGT and the second VGT, such as within a 1% deviation, in order to maintain the same aspect ratio, and therefore the same turbine inlet pressure and turbine pressure ratio at each VGT. Adjustment of each of the first VGT and the second VGT may include feedforward open loop control and/or feedback closed loop control. In one example, the feedforward control may be based on signals received from turbine position sensors (not shown) included within each of the first VGT of the first turbocharger and the second VGT of the second turbocharger. In another example, the feedback control may be based on the manifold pressure measurements takin in 402 via the MAP sensor. Method 400 may then proceed to 416.

If it is determined that the boost pressure is not greater than the target level of boost, then it may be inferred that the boost pressure may be substantially equal to the target level of boost, where substantially equal may be defined as equal within some threshold accuracy of pressure measurements obtained by the MAP sensor (e.g., as within 1%), and no further adjustment of the VGTs is desired (the positions of each of the VGTs may be maintained). At 416, method 400 may include determining if a first turbocharger is overspeeding, and additionally if the first VGT of the first turbocharger is fully open. Overspeeding of the first turbocharger may include a speed of the first turbocharger being above a first threshold speed. The first threshold speed may be a pre-calibrated threshold, and may be a speed above which mechanical damage to the first turbocharger (such as the vanes and the shaft of the first VGT) may occur. Determining if the first turbocharger is overspeeding includes modeling or measuring the speed of the first turbocharger via a turbine speed sensor (not shown) included on a first driveshaft (such as first driveshafts 220, 322 of FIGS. 2, 3, respectively), and determining if the speed of the first turbocharger is greater than the first speed threshold. Additionally, determining if the first VGT is fully open may include sensing if the vanes of the first VGT are in a fully open position via the turbine position sensor (not shown) included within the first VGT of the first turbocharger.

If it is determined that the first turbocharger is overspeeding and that the first VGT is in a fully open position, then at 418, method 400 may include opening the first WG. Opening of the first WG may allow exhaust to bypass the first VGT of the first turbocharger, thereby reducing pressure at the first VGT, allowing the first turbocharger to reduce its speed to prevent overspeeding. Method 400 may proceed to 420.

If it is determined that either the first turbocharger is not overspeeding, or that the first VGT is not in a fully open position, or both, then at 420, method 400 may include determining if a second turbocharger is overspeeding, and if the second VGT of the second turbocharger is fully open. Overspeeding of the second turbocharger may include a speed of the second turbocharger being above a second threshold speed. The second threshold speed may be a pre-calibrated threshold, and may be a speed above which mechanical damage to the second turbocharger (such as the vanes and the shaft of the second VGT) may occur. Determining if the second turbocharger is overspeeding includes modeling or measuring the speed of the second turbocharger via a turbine speed sensor (not shown) included on a second driveshaft (such as second driveshafts 242, 342 of FIGS. 2, 3, respectively). Additionally, determining if the second VGT is fully open may include sensing if the vanes of the second VGT are in a fully open position via a turbine position sensor (not shown) included within the second VGT of the second turbocharger.

If it is determined that the second turbocharger is overspeeding and that the second VGT is in a fully open position, then at 422, method 400 may include opening the second WG. Opening of the second WG may allow exhaust to bypass the second VGT of the second turbocharger, thereby reducing pressure at the second VGT, allowing the second VGT to reduce its speed to prevent overspeeding. Method 400 may proceed to 424.

At 424, method 400 may include determining whether there is a surge at the first compressor. Compressor surge may occur when a pressure ratio of the first compressor (e.g. the ratio of the output pressure to the inlet pressure, also termed first compressor ratio) is too great relative to the flow of air through the first compressor. Compressor surge may include a reduction or altogether loss of axial flow of the air charge through the first compressor, and may result in turbulent flow within the first compressor. For example, compressor surge may include a periodic variation in the axial flow of air through the first compressor, possibly including negative or periodically negative axial flow through the compressor. Compressor surge may be detected via joint measurements of mass air flow (MAF) through the first compressor (M) and the first pressure ratio of the first turbocharger (P). For example, the first compressor may include an inlet pressure sensor (not shown) and an output pressure sensor (not shown), in addition to a MAF sensor (not shown) upstream of the first compressor, allowing measurement of the first pressure ratio and the MAF through the first compressor. Based on the measurements received from each of the inlet pressure sensor, the output pressure sensor, and the output MAF sensor of the first compressor, the controller may determine if the first compressor is at an operating point (M, P) indicative of compressor surge, e.g. the operating point (M, P) of the first compressor is beyond a first surge limit. In one example, a locus of operating points beyond a first surge limit may be a pre-calibrated set of values pre-programmed into the non-transient memory of the controller. In another example, the locus of operating points may be defined by a mathematical function taking M and P as inputs. If at 424 it is determined that the first compressor is operating beyond a first surge limit, method 400 may proceed to 426, whereby a first compressor recirculation valve (CRV) (such as first CRVs 216, 326 of FIGS. 2, 3, respectively) may be actuated to an open position, in order to recirculate air from downstream of the first compressor to upstream of the first compressor, thereby reduce the pressure ratio across the first compressor. Method 400 may then proceed to 428. If at 424 it is determined that there is no surge at the first compressor, then method 400 may also proceed to 428.

At 428, method 400 includes determining if there is a surge at the second compressor. As explained in relation to 424, compressor surge may be detected via joint measurements of mass air flow (MAF) through the second compressor (M) and the pressure ratio (also termed second pressure ratio) of the second compressor (P). For example, the second compressor may include an inlet pressure sensor (not shown) and an output pressure sensor (not shown), in addition to a MAF sensor (not shown) upstream of the second compressor, allowing measurement of the second pressure ratio and the MAF through the second compressor. Based on the measurements received from each of the inlet pressure sensor, the output pressure sensor, and the output MAF sensor of the second compressor, the controller may determine if the second compressor is at an operating point (M, P) indicative of compressor surge, e.g. the operating point (M, P) of the second compressor is beyond a second surge limit. In one example, a locus of operating points indicating operation of the second compressor beyond the second surge limit may be a pre-calibrated set of values pre-programmed into the non-transient memory of the controller. In another example, the locus of operating points may be defined by a mathematical function taking M and P as inputs. The locus of operating points for detecting compressor surge at the first compressor may be different than the locus of operating points for detecting compressor surge at the second compressor, due to the different diameters of the first compressor and the second compressor. If at 428 it is determined that the second compressor is operating beyond a second surge limit, method 400 may proceed to 430, whereby the first CRV is maintained, while a second compressor recirculation valve (CRV) (such as second CRVs 234, 340 of FIGS. 2, 3, respectively) may be actuated to an open position, recirculate air from downstream of the second compressor to upstream of the second compressor, thereby reducing the pressure ratio across the second compressor. Following 430, method 400 may then end. If it is determined that there is no surge at the second compressor, then method 400 may proceed to 432 to maintain current engine operating conditions, and method 400 may end.

In this way, exhaust may be flowed through each of the first turbine and the second turbine, the first turbine and the second turbine connected in parallel, and pressurized intake air may be flowed through an intake passage at each of a first compressor of the first turbocharger and a second compressor of the second turbocharger, the first compressor and the second compressor connected in series. The exhaust may be flowed through the dual turbocharger system based on the catalyst temperature and the target level of boost. In particular, when the catalyst temperature is above a threshold temperature and/or the target level of boost is above a threshold boost pressure, each of the first WG and the second WG may be closed, and each of the first VGT and the second VGT may be adjusted to have either decreased or increased exhaust flow velocity therethrough, depending on if the boost pressure is less than the target level of boost or greater than or equal to the target level of boost, respectively. By adjusting the exhaust flow velocity through each of the first turbine and the second turbine, the boost pressure may be adjusted in order to match the target level of boost desired during the Miller cycle. Additionally, the CRVs of each of the turbochargers may be adjusted to prevent compressor surging. In particular, in response to a first compressor exceeding a first surge threshold the first compressor recirculation valve may be opened, and/or in response to a second compressor exceeding a second surge threshold, the second compressor recirculation valve may be opened. By adjusting the geometry of the VGTs and the state of the waste gates in response to the target level of boost, and adjusting the state of the compressor recirculation valves in response to compressor surging, the dual turbocharger system may provide adequate boost levels for high boost operations, e.g. a Miller cycle, over a range of engine operating conditions.

Turning now to FIG. 5, example timeline 500 depicts a prophetic example of operation of a dual turbocharger system (such as dual turbocharger systems 201, 301, of FIGS. 2, 3, respectively) during operation of an engine (such as engine 10 of FIG. 1 and engine systems 200, 300 of FIGS. 2, 3, respectively), in accordance with method 400 of FIG. 4. The horizontal (x-axis) denotes times and the vertical markers t0-t5 identify significant points during operation of the dual turbocharger system.

The example timeline 500 illustrates operation of a dual turbocharger system during engine operation, e.g. during engine operation of a Miller engine cycle. During engine operation, the engine boost pressure changes in response to changes in the position of the VGTs (e.g., first turbines 218, 320 and second turbines 238, 344) of the respective turbochargers (e.g. first turbochargers 205, 305 and second turbochargers 207, 307), in order to generate a sufficient level of boost at each of a first compressor (e.g. first compressors 222, 324) of the first turbocharger, and a second compressor (e.g., second compressors 236, 346) of the second turbocharger, according to a target level of boost. The target level of boost changes in response to boost requirements, such as during a Miller cycle, and in addition to torque requirements of the engine during engine operation, such as determined by a pedal position sensor (e.g. pedal position sensor 134 of FIG. 1) included on an input device (e.g. input device 130 of FIG. 1), and may be compared to a threshold boost pressure. The target level of boost is shown by dashed line 502, the boost pressure generated by the dual turbocharger system is shown in plot 504, and the threshold boost pressure is shown in plot 506. In order to adjust the boost pressure of the dual turbocharger system, the first VGT of the first turbocharger and the second VGT of the second turbocharger are adjusted according to the target level of boost. The position of the first VGT is shown in plot 508, indicated as VGT1, while the position of the second VGT is shown in plot 510, indicated as VGT2. The fully open position of the VGTs in plots 508, 510 is indicated by a 1, while the fully closed positions of the VGTs in plots 508, 510, is indicated by a 0.

In addition to the turbines including a variable geometry in order to optimize exhaust flow, each VGT also includes a waste gate (WG) coupled across the respective VGT, in order to vary the amount of exhaust flowing to the turbines of the respective VGTs. A position of a first WG (e.g., first WG 250, 354) of the first turbocharger is shown in plot 512, indicated as WG1, while a position of a second WG (e.g., second WGs 252, 356) of the second turbocharger is shown in plot 514, indicated as WG2. The fully open position of the WGs in plots 512, 514 is indicated by a 1, while the fully closed positions of the WGs in plots 512, 514, is indicated by a 0. The WGs allow diversion of exhaust from a turbine of a VGT, so as to reduce or stop driving of the VGT. The amount of boosting generated by a compressor of a turbocharger is therefore related to the degree of opening of a respective WG. Thus, by controlling the opening and closing of each of the first WG and the second WG, in addition to a position of the first VGT and a position of the second VGT, the amount of boost generated by each of the first and the second compressor can be actively controlled according to the target level of boost. Additionally, initiation of boosting via the dual turbocharger system occurs when a temperature of an emission control device (e.g. emission control device 178 of FIG. 1) is above a threshold temperature. The threshold temperature is illustrated by dashed line 516, while the temperature of the emission control device is indicated by plot 518. In the example timeline 500, the conditions of overspeeding of the VGTs of respective turbochargers, in addition to compressor surge at each of the compressors of respective turbochargers do not occur. However, other example timelines may include either overspeeding, or compressor surge, or both, and hence the example timeline 500 of FIG. 5 should not be taken as a limiting example.

At t0, the engine is started in a cold-start condition. Therefore, at t0, the temperature of the emission control device is below the threshold temperature. Each of the first VGT and the second VGT are in a fully open position, and each of the first WG and the second WG are in a fully closed position. Due to the temperature of the emission control device being below the threshold temperature and low torque demand, the target level of boost remains close to 0, and the boost pressure stays close to 0, with each having minor variations in response to minor variations in the torque demand.

At t1, the temperature is determined to be below the threshold temperature, via a temperature sensor (e.g., temperature sensor 177) included on the emission control device. In response to the temperature of the emission control device being below the threshold temperature, heat is directed towards the emission control device in order to get the temperature of the emission control device above the threshold temperature. Therefore, in response to the temperature of the emission control device being below the threshold temperature, each of the first WG and the second WG are actuated from a fully closed position to a fully open position, in order to allow heat from the exhaust to be diverted entirely to the emission control device. Also at t1, the first VGT and the second VGT are adjusted from a fully open position to a fully closed position, in order to direct most of the exhaust gas through the first WG and the second WG. From t1 to t2, in response to opening of each of the first WG and the second WG, the temperature of the emission control device increases, due to heat from the exhaust being diverted entirely to the emission control device.

At t2, the temperature of the emission control device reaches the threshold temperature. Additionally, at t2, the boost pressure is less than the target level of boost. In response to the temperature of the emission control device reaching the threshold temperature, each of the first WG and the second WG are actuated from fully open positions to fully closed positions. Additionally, in response to the temperature of the emission control device increasing to the threshold temperature and the boost pressure being less than the target level of boost, the engine initiates boosting, such as for a Miller cycle, and the positions of each of the first VGT and the second VGT are adjusted from a fully closed position to a near-closed (but not fully closed) position, so that higher pressures and turbine speeds are generated at each of the respective VGTs. The positions of each of the first VGT and the second VGT are adjusted by the same amount, in order to maintain similar P3 pressures at corresponding cylinders (e.g., first set of cylinders 204, 308, and second set of cylinders 206, 310).

From t2 to t3, a torque demand from the engine increases. In response to the increased torque demand of the engine, the target level of boost is increased. Additionally, the boost pressure continues to be less than the increased target level of boost. In response to the increased target level of boost, from t2 to t3, the positions of each of the first VGT and the second VGT continue to be maintained in a nearly-closed position in order to increase the boost pressure toward the target boost pressure. Consequently, from t2 to t3, the boost pressure increases; however, the value of the boost pressure does not increase above the target level of boost. Additionally, from t2 to t3, the target level of boost increases beyond the threshold boost pressure.

At t3, the boost pressure has increased to reach the target boost pressure, and the positions of each of the first VGT and the second VGT are adjusted (increased) in order to maintain the boost pressure at the target level of boost. The positions of each of the first VGT and the second VGT are adjusted by the same amount, in order to maintain similar P3 pressures at the corresponding cylinders. Consequently, from t3 to t4, the boost pressure stays relatively constant (e.g. within 5% of the value obtained at t3), with minor variations according to the torque demand based on engine operation. However, due to decreased engine torque demand, from t3 to t4, the target boost decreases.

At t4, in response to the decreased torque demand from engine operation, the target boost decreases to the boost pressure. In response to the target level of boost decreasing to the boost pressure, the positions of each of the first VGT and the second VGT are adjusted, increasing a level of opening of the respective VGTs in order to decrease the boost pressure. From t4 to t5, the opening positions of the first VGT and the second VGT are continually increased. Correspondingly, in response to the increased opening of each of the first VGT and the second VGT, the boost pressure decreases, and in response to the decreased torque demand from the engine, the target level of boost decreases; however the value of the boost pressure does not decrease below the target level of boost.

At t5, the positions of each of the first VGT and the second VGT stay at a fixed position, according to the target level of boost. Correspondingly, from t5 onwards, the position of each of the first VGT and the second VGT are maintained, and the boost pressure is maintained close to the target level of boost, which changes slightly in response to the torque demand of the engine.

In this way, by including a dual turbocharger system with two parallel variable geometry turbines of a similar size and two compressors in series of differing size, optimal levels of boost may be provided over a range of engine operating conditions, in particular with an engine operating in a Miller cycle, which has high boost requirements. In contrast to compressors being positioned in parallel, with each compressor taking half of the intake air, arranging each compressor of a first turbocharger and a second turbocharger in series may allow for a full amount of air to be included within each stage of boosting. Incorporating two compressors of different sizes may also allow for optimal boosting operation over a range of engine speeds and loads. Further, by including each variable geometry turbine (VGT) of the first turbocharger and the second turbocharger in parallel, each VGT may be maintain a similar P3 pressure. The technical effect of including operating similarly sized VGTs in parallel and differently sized compressors in series is that high boost pressures (e.g. with a pressure ratio of 6) may be achieved, while pulse interference may be reduced. Additionally, by including two compressors in series and two VGTs in parallel, simplified packaging for a V6 engine may be achieved over other V6 dual turbocharger configurations.

The disclosure provides support for a system for an engine, comprising: a first turbocharger including a first turbine and a first compressor, and a second turbocharger including a second turbine and a second compressor, the first and second compressors differently sized and coupled in series. In a first example of the system, the engine includes a first cylinder bank and a second cylinder bank, each of the first cylinder bank and the second cylinder bank including an equal number of cylinders. In a second example of the system, optionally including the first example, the first turbine is housed in a first exhaust passage coupled to the first cylinder bank, and wherein the second turbine is housed in a second exhaust passage coupled to the second cylinder bank, the first turbine parallel to the second turbine. In a third example of the system, optionally including one or both of the first and second examples, each of the first turbine and the second turbine is a variable geometry turbine (VGT) of a same size. In a fourth example of the system, optionally including one or more or each of the first through third examples, the first compressor is larger in diameter relative to the second compressor. In a fifth example of the system, optionally including one or more or each of the first through fourth examples, the system further comprises: a first charge air cooler coupled to an intake passage between the first compressor and the second compressor, and a second air cooler coupled to the intake passage downstream of the second compressor. In a sixth example of the system, optionally including one or more or each of the first through fifth examples, the system further comprises: a first compressor recirculation valve coupled across the first compressor and a second compressor recirculation valve coupled across the second compressor.

The disclosure also provides support for a method for an engine, comprising: flowing exhaust through each of a first turbine of a first turbocharger and a second turbine of a second turbocharger, the first turbine and the second turbine connected in parallel, and pressurizing intake air flowing through an intake passage at each of a first compressor of the first turbocharger and a second compressor of the second turbocharger, the first compressor and the second compressor connected in series. In a first example of the method, the first turbine is coupled to a first bank of cylinders while the second turbine is coupled to a second bank of cylinders, the first and second bank including an equal number of cylinders. In a second example of the method, optionally including the first example, the first turbine is equal in size with the second turbine, and wherein the first compressor is larger than the second compressor. In a third example of the method, optionally including one or both of the first and second examples, the method further comprises: during a temperature of an emission control device being lower than a threshold temperature and a target level of boost being lower than a threshold boost, opening each of a first waste gate coupled across the first turbine and a second waste gate coupled across the second turbine, adjusting geometry of each of the first turbine and the second turbine to closed positions, and flowing exhaust from an exhaust manifold to the emission control device. In a fourth example of the method, optionally including one or more or each of the first through third examples, the method further comprises: in response to at least one of the temperature of the emission control device being greater than the threshold temperature and the target level of boost being greater than the threshold boost while a boost pressure is lower than the target level of boost, closing each of the first waste gate and the second waste gate, adjusting geometry of the first turbine and the second turbine to decrease opening of each of the first turbine and the second turbine, and pressurizing the intake air at each of the first compressor and the second compressor. In a fifth example of the method, optionally including one or more or each of the first through fourth examples, the method further comprises: in response to at least one of the temperature of the emission control device being greater than the threshold temperature and the target level of boost being greater than the threshold boost while a boost pressure being higher than a target boost, closing each of the first waste gate and the second waste gate, adjusting geometry to increase opening of each of the first turbine and the second turbine, and pressurize the intake air at each of the first compressor and the second compressor. In a sixth example of the method, optionally including one or more or each of the first through fifth examples, the method further comprises: in response to one of the temperature of the emission control device being greater than the threshold temperature and the target level of boost being greater than the threshold boost, adjusting the geometry of each of the first turbine and the second turbine is identically to maintain an equal turbine inlet exhaust manifold gas pressure at a first inlet of the first turbine and a second inlet of the second turbine. In a seventh example of the method, optionally including one or more or each of the first through sixth examples, the method further comprises: cooling the pressurized air exiting the first compressor at a first charge air cooler positioned between the first compressor and the second compressor, and then further cooling the pressurized air exiting the second compressor at a second charge air cooler positioned downstream of the second compressor. In an eighth example of the method, optionally including one or more or each of the first through seventh examples, the method further comprises: in response to a first compressor ratio increasing to a first surge limit, opening a first compressor recirculation valve coupled across the first compressor, and/or in response to a second compressor ratio increasing to a second surge limit, opening a second compressor recirculation valve coupled across the second compressor. In a ninth example of the method, optionally including one or more or each of the first through eighth examples, the engine includes an I6 or a V6 configuration with the first bank including three cylinders firing at intervals of 240° crank angles and the second bank including three cylinders firing at intervals of 240° crank angles.

The disclosure also provides support for a system for an engine in a vehicle, comprising: a first turbocharger including a first turbine configured to receive exhaust gas from a first bank of engine cylinders, and a first, larger compressor, and a second turbocharger including a second turbine configured to receive exhaust gas from a second bank of engine cylinders, and a second, smaller compressor, the first turbine parallel to the second turbine while the first, larger compressor in series with the second, smaller compressor. In a first example of the system, the first turbine and the second turbine are equally sized variable geometry turbines, the first turbine and the second turbine adjustable to a same opening position. In a second example of the system, optionally including the first example, the system further comprises: a controller storing instructions in non-transitory memory that, when executed, cause the controller to: flow an entire volume of intake air entering an intake manifold through the first, larger compressor, a first charge air cooler positioned between the first, larger compressor and the second, smaller compressor, the second, smaller compressor, and a second charge air cooler positioned downstream of the second, smaller compressor prior to entering an intake manifold supplying intake air to each engine cylinders of the first bank and the second bank.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-8, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
flowing exhaust through each of a first turbine of a first turbocharger and a second turbine of a second turbocharger, the first turbine and the second turbine connected in parallel; and
pressurizing intake air flowing through an intake passage at each of a first compressor of the first turbocharger and a second compressor of the second turbocharger, the first compressor and the second compressor connected in series, wherein the first turbine is equal in size with the second turbine, and wherein the first compressor is larger than the second compressor.

2. A method for an engine, comprising:
flowing exhaust through each of a first turbine of a first turbocharger and a second turbine of a second turbocharger, the first turbine and the second turbine connected in parallel; and
pressurizing intake air flowing through an intake passage at each of a first compressor of the first turbocharger and a second compressor of the second turbocharger, the first compressor and the second compressor connected in series, wherein the first turbine is coupled to a first bank of cylinders while the second turbine is coupled to a second bank of cylinders, the first and second bank including an equal number of cylinders.

3. The method of claim 2, wherein the first turbine is equal in size with the second turbine, and wherein the first compressor is larger than the second compressor.

4. The method of claim 2, wherein the engine includes an I6 or a V6 configuration with the first bank including three cylinders firing at intervals of 240° crank angles and the second bank including three cylinders firing at intervals of 240° crank angles.

5. A method for an engine, comprising:
flowing exhaust through each of a first turbine of a first turbocharger and a second turbine of a second turbocharger, the first turbine and the second turbine connected in parallel;
pressurizing intake air flowing through an intake passage at each of a first compressor of the first turbocharger and a second compressor of the second turbocharger, the first compressor and the second compressor connected in series; and
during a temperature of an emission control device being lower than a threshold temperature and a target level of boost being lower than a threshold boost, opening each of a first waste gate coupled across the first turbine and a second waste gate coupled across the second turbine, adjusting geometry of each of the first turbine and the second turbine to closed positions, and flowing exhaust from an exhaust manifold to the emission control device.

6. The method of claim 5, further comprising, in response to at least one of the temperature of the emission control device being greater than the threshold temperature and the target level of boost being greater than the threshold boost while a boost pressure is lower than the target level of boost, closing each of the first waste gate and the second waste gate, adjusting geometry of the first turbine and the second turbine to decrease opening of each of the first turbine and the second turbine, and pressurizing the intake air at each of the first compressor and the second compressor.

7. The method of claim 6, further comprising, in response to at least one of the temperature of the emission control device being greater than the threshold temperature and the target level of boost being greater than the threshold boost while a boost pressure being higher than a target boost, closing each of the first waste gate and the second waste gate, adjusting geometry to increase opening of each of the first turbine and the second turbine, and pressurize the intake air at each of the first compressor and the second compressor.

8. The method of claim 7, further comprising, in response to one of the temperature of the emission control device being greater than the threshold temperature and the target level of boost being greater than the threshold boost, adjusting the geometry of each of the first turbine and the second turbine is identically to maintain an equal turbine inlet exhaust manifold gas pressure at a first inlet of the first turbine and a second inlet of the second turbine.

9. The method of claim 7, further comprising cooling the pressurized air exiting the first compressor at a first charge air cooler positioned between the first compressor and the second compressor, and then further cooling the pressurized air exiting the second compressor at a second charge air cooler positioned downstream of the second compressor.

10. The method of claim 7, further comprising, in response to a first compressor ratio increasing to a first surge limit, opening a first compressor recirculation valve coupled across the first compressor, and/or in response to a second compressor ratio increasing to a second surge limit, opening a second compressor recirculation valve coupled across the second compressor.

11. A system for an engine in a vehicle, comprising:
a first turbocharger including a first turbine configured to receive exhaust gas from a first bank of engine cylinders, and a first, larger compressor; and
a second turbocharger including a second turbine configured to receive exhaust gas from a second bank of engine cylinders, and a second, smaller compressor, the first turbine parallel to the second turbine while the first, larger compressor in series with the second, smaller compressor, wherein the first turbine and the second turbine are equally sized variable geometry turbines, the first turbine and the second turbine adjustable to a same opening position.

12. The system of claim 11, further comprising:
a controller storing instructions in non-transitory memory that, when executed, cause the controller to:
flow an entire volume of intake air entering an intake manifold through the first, larger compressor, a first charge air cooler positioned between the first, larger compressor and the second, smaller compressor, the second, smaller compressor, and a second charge air cooler positioned downstream of the second, smaller compressor prior to entering an intake manifold supplying intake air to each engine cylinders of the first bank and the second bank.

* * * * *

UNITED STATES PATENT AND TRADEMARK OFFICE
CERTIFICATE OF CORRECTION

Page 1 of 1

PATENT NO. : 11,585,301 B1
APPLICATION NO. : 17/644305
DATED : February 21, 2023
INVENTOR(S) : Brad Boyer et al.

It is certified that error appears in the above-identified patent and that said Letters Patent is hereby corrected as shown below:

In the Specification

Column 1 Line 10, please add:
--"This material is based upon work supported by the U.S. Department of Energy under Award Number DE-EE0008878. The government has certain rights in the invention."--

Signed and Sealed this
Ninth Day of May, 2023

Katherine Kelly Vidal
*Director of the United States Patent and Trademark Office*